(12) United States Patent
Martin et al.

(10) Patent No.: US 12,243,057 B2
(45) Date of Patent: Mar. 4, 2025

(54) OFFLINE STORAGE SYSTEM AND METHOD OF USE

(71) Applicant: Coinbase, Inc., San Francisco, CA (US)

(72) Inventors: Philip Martin, San Francisco, CA (US); Julian Borrey, San Francisco, CA (US); Yolanda Liu, San Francisco, CA (US); Zachary Blacher, San Francisco, CA (US); Robert John Kearney, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/044,121

(22) PCT Filed: Apr. 17, 2019

(86) PCT No.: PCT/US2019/027857
§ 371 (c)(1),
(2) Date: Sep. 30, 2020

(87) PCT Pub. No.: WO2019/204426
PCT Pub. Date: Oct. 24, 2019

(65) Prior Publication Data
US 2021/0019971 A1 Jan. 21, 2021

Related U.S. Application Data

(60) Provisional application No. 62/687,157, filed on Jun. 19, 2018, provisional application No. 62/658,856, filed on Apr. 17, 2018.

(51) Int. Cl.
*G06Q 20/40* (2012.01)
*H04L 9/00* (2022.01)
(Continued)

(52) U.S. Cl.
CPC ......... *G06Q 20/401* (2013.01); *H04L 9/0637* (2013.01); *H04L 9/0825* (2013.01);
(Continued)

(58) Field of Classification Search
CPC ............ G07C 2209/04; G07C 9/00309; G07C 9/00904; G07C 9/27; H04L 63/105;
(Continued)

(56) References Cited

U.S. PATENT DOCUMENTS 5,884,274 A   3/1999  Walker et al.
6,125,186 A   9/2000  Saito et al.
(Continued)

FOREIGN PATENT DOCUMENTS

EP   2634738 A1     9/2013
JP   2007109002 A   4/2007
(Continued)

OTHER PUBLICATIONS

"A plea to exchanges . . . lets do 2 factor right!" Bitcoin Forum, download from https://bitcointalk.org/index.php?topic=109424.0%E2%80%93%20Stephen%20Gomick%20NOV%205%20%2712%20at%2016:56 (posted Sep. 14, 2012), (10 pages).
(Continued)

*Primary Examiner* — Mohamed Barakat
(74) *Attorney, Agent, or Firm* — Foley & Lardner LLP

(57) ABSTRACT

A method for storing a cryptocurrency private key offline, including: encrypting the cryptocurrency private key using a primary encryption key; sharding the encrypted cryptocurrency private key into a plurality of alpha shards; generating beta shards by encrypting the alpha shards with secondary encryption keys; and storing representations of the beta shards offline. The method can additionally or alternatively include: retrieving the representations of the beta shards from the offline storage; decrypting the beta shards into the
(Continued)

alpha shards based on the secondary encryption keys; reconstructing the encrypted cryptocurrency private key by recombining the alpha shards; and decrypting the encrypted cryptocurrency private key with the primary encryption key.

19 Claims, 5 Drawing Sheets

(51) Int. Cl.
*H04L 9/06* (2006.01)
*H04L 9/08* (2006.01)
*H04L 9/14* (2006.01)
*H04L 9/30* (2006.01)

(52) U.S. Cl.
CPC ............... *H04L 9/085* (2013.01); *H04L 9/14* (2013.01); *H04L 9/3073* (2013.01); *H04L 9/50* (2022.05); *G06Q 2220/00* (2013.01); *H04L 2209/56* (2013.01)

(58) Field of Classification Search
CPC ..... H04L 9/0637; H04L 9/0825; H04L 9/085; H04L 9/14; H04L 9/3073; H04L 9/50; H04L 2209/56; G06Q 20/401; G06Q 2220/00

See application file for complete search history.

(56) References Cited

U.S. PATENT DOCUMENTS

| | | |
|---|---|---|
| 6,952,683 B1 | 10/2005 | Gerhard |
| 6,959,394 B1 | 10/2005 | Brickell et al. |
| 7,644,037 B1 | 1/2010 | Ostrovsky |
| 7,689,500 B2 | 3/2010 | Cottrell |
| 7,689,550 B2 | 3/2010 | Lee et al. |
| 7,970,823 B2 | 6/2011 | Moeller et al. |
| 8,055,575 B2 | 11/2011 | Grody et al. |
| 8,111,648 B2 | 2/2012 | Gandham |
| 8,117,648 B2 | 2/2012 | Slaton et al. |
| 8,606,703 B1 | 12/2013 | Dorsey et al. |
| 8,839,386 B2 | 9/2014 | Gilboy |
| 8,855,318 B1 | 10/2014 | Patnala et al. |
| 9,071,429 B1 | 6/2015 | Roth et al. |
| 9,135,787 B1 | 9/2015 | Russell et al. |
| 9,224,262 B2 | 12/2015 | Fine et al. |
| 9,495,668 B1 | 11/2016 | Juels |
| 9,892,460 B1* | 2/2018 | Winklevoss ........... G06Q 40/04 |
| 10,068,228 B1 | 9/2018 | Winklevoss et al. |
| 10,180,912 B1 | 1/2019 | Franklin et al. |
| 10,229,396 B2* | 3/2019 | Shtylman ............ G06Q 20/381 |
| 10,256,983 B1 | 4/2019 | Bauer et al. |
| 10,269,009 B1 | 4/2019 | Winklevoss et al. |
| 10,332,205 B1 | 6/2019 | Russell et al. |
| 10,375,037 B2* | 8/2019 | Baird, III ............. H04L 9/3236 |
| 10,469,309 B1 | 11/2019 | Gupta et al. |
| 10,586,057 B2 | 3/2020 | Keselman et al. |
| 10,733,291 B1 | 8/2020 | McLeod |
| 10,873,450 B2* | 12/2020 | Keselman ............ H04L 9/0861 |
| 2001/0034605 A1 | 10/2001 | Hoffman |
| 2001/0050990 A1 | 12/2001 | Sudia |
| 2002/0023053 A1 | 2/2002 | Szoc et al. |
| 2002/0116611 A1 | 8/2002 | Zhou et al. |
| 2003/0048906 A1 | 3/2003 | Vora et al. |
| 2005/0010760 A1 | 1/2005 | Goh et al. |
| 2005/0138374 A1 | 6/2005 | Zheng et al. |
| 2006/0168663 A1 | 7/2006 | Mljoen et al. |
| 2007/0223706 A1 | 9/2007 | Rose |
| 2007/0255943 A1 | 11/2007 | Kern et al. |
| 2007/0258585 A1* | 11/2007 | Sandhu ................. H04L 9/302 380/44 |
| 2008/0091586 A1 | 4/2008 | Cottrell |
| 2008/0095375 A1* | 4/2008 | Tateoka ................ H04L 9/085 380/282 |
| 2008/0263363 A1 | 10/2008 | Jueneman et al. |
| 2009/0037405 A1 | 2/2009 | Lee et al. |
| 2009/0144810 A1 | 6/2009 | Gilboy |
| 2009/0177894 A1 | 7/2009 | Orsini et al. |
| 2009/0205036 A1 | 8/2009 | Slaton et al. |
| 2009/0254750 A1 | 10/2009 | Bono et al. |
| 2010/0054458 A1 | 3/2010 | Schneider |
| 2010/0175061 A1 | 7/2010 | Maeda et al. |
| 2010/0235588 A1 | 9/2010 | Maeda et al. |
| 2011/0071958 A1 | 3/2011 | Grody et al. |
| 2011/0087582 A1 | 4/2011 | Pak et al. |
| 2011/0106675 A1 | 5/2011 | Perlman |
| 2011/0202755 A1 | 8/2011 | Orsini et al. |
| 2011/0251941 A1 | 10/2011 | Dunwoody |
| 2012/0136782 A1 | 5/2012 | Norman et al. |
| 2012/0150750 A1 | 6/2012 | Aw et al. |
| 2012/0239556 A1 | 9/2012 | Magruder et al. |
| 2013/0010966 A1 | 1/2013 | Li et al. |
| 2013/0065670 A1 | 3/2013 | Michaelson et al. |
| 2013/0166455 A1 | 6/2013 | Feigelson |
| 2013/0191632 A1 | 7/2013 | Spector et al. |
| 2013/0246261 A1 | 9/2013 | Purves et al. |
| 2013/0290710 A1 | 10/2013 | Broder et al. |
| 2013/0318347 A1 | 11/2013 | Moffat |
| 2013/0339738 A1 | 12/2013 | Shaw |
| 2013/0343546 A1 | 12/2013 | Shibutani et al. |
| 2014/0019352 A1 | 1/2014 | Shrivastava |
| 2014/0025473 A1 | 1/2014 | Cohen |
| 2014/0052617 A1 | 2/2014 | Chawla et al. |
| 2014/0057599 A1 | 2/2014 | Hazari |
| 2014/0082749 A1 | 3/2014 | Holland et al. |
| 2014/0108223 A1 | 4/2014 | Xiao |
| 2014/0156512 A1 | 6/2014 | Rahman et al. |
| 2014/0172633 A1 | 6/2014 | Dogin et al. |
| 2014/0229739 A1 | 8/2014 | Roth et al. |
| 2014/0274327 A1 | 9/2014 | Fine et al. |
| 2014/0279436 A1 | 9/2014 | Dorsey et al. |
| 2014/0281550 A1 | 9/2014 | Resch |
| 2014/0289118 A1 | 9/2014 | Kassemi et al. |
| 2014/0297537 A1 | 10/2014 | Kassemi et al. |
| 2014/0304171 A1 | 10/2014 | Mertens et al. |
| 2015/0033301 A1 | 1/2015 | Pianese et al. |
| 2015/0039444 A1 | 2/2015 | Hardin et al. |
| 2015/0050987 A1 | 2/2015 | Huang et al. |
| 2015/0120569 A1 | 4/2015 | Belshe et al. |
| 2015/0127495 A1 | 5/2015 | Houri |
| 2015/0170112 A1 | 6/2015 | Decastro |
| 2015/0178693 A1 | 6/2015 | Solis |
| 2015/0209678 A1 | 7/2015 | Edwards et al. |
| 2015/0220928 A1 | 8/2015 | Allen |
| 2015/0227897 A1 | 8/2015 | Loera |
| 2015/0228004 A1 | 8/2015 | Bednarek et al. |
| 2015/0262137 A1 | 9/2015 | Armstrong |
| 2015/0262139 A1 | 9/2015 | Shtylman |
| 2015/0262171 A1 | 9/2015 | Langschaedel et al. |
| 2015/0262173 A1 | 9/2015 | Durbin et al. |
| 2015/0262176 A1 | 9/2015 | Langschaedel et al. |
| 2015/0287026 A1 | 10/2015 | Yang et al. |
| 2015/0294308 A1 | 10/2015 | Pauker et al. |
| 2015/0302401 A1 | 10/2015 | Metral |
| 2015/0310424 A1 | 10/2015 | Myers |
| 2015/0332256 A1 | 11/2015 | Minor |
| 2015/0365283 A1 | 12/2015 | Ronca et al. |
| 2016/0034896 A1 | 2/2016 | O'Brien et al. |
| 2016/0085955 A1 | 3/2016 | Lerner |
| 2016/0086418 A1 | 3/2016 | Smolen et al. |
| 2016/0171570 A1 | 6/2016 | Dogin et al. |
| 2016/0191250 A1 | 6/2016 | Bestler et al. |
| 2016/0203572 A1 | 7/2016 | McConaghy et al. |
| 2016/0253907 A1* | 9/2016 | Taveira ................. G05D 1/106 701/3 |
| 2016/0261411 A1 | 9/2016 | Yau et al. |
| 2016/0277398 A1 | 9/2016 | Gregg et al. |
| 2016/0321654 A1 | 11/2016 | Lesavich et al. |
| 2016/0344543 A1 | 11/2016 | Alness et al. |
| 2016/0380767 A1 | 12/2016 | Hayashi et al. |
| 2017/0063531 A1 | 3/2017 | Sullivan |
| 2017/0083718 A1 | 3/2017 | Peddada et al. |
| 2017/0161439 A1 | 6/2017 | Raduchel et al. |

(56) References Cited

U.S. PATENT DOCUMENTS

| | | | |
|---|---|---|---|
| 2017/0228953 A1* | 8/2017 | Lupovici | G07C 9/00896 |
| 2017/0293769 A1* | 10/2017 | Quinlan | G06F 21/6209 |
| 2018/0024740 A1 | 1/2018 | Miller et al. | |
| 2018/0075453 A1 | 3/2018 | Durvasula et al. | |
| 2018/0191503 A1 | 7/2018 | Alwar et al. | |
| 2018/0248704 A1 | 8/2018 | Coode et al. | |
| 2018/0367316 A1 | 12/2018 | Cheng et al. | |
| 2019/0236245 A1 | 8/2019 | Desarzens et al. | |
| 2019/0288840 A1* | 9/2019 | Gallancy | G06F 21/602 |
| 2020/0019685 A1 | 1/2020 | Takahashi | |
| 2020/0036707 A1 | 1/2020 | Callahan et al. | |
| 2020/0044833 A1 | 2/2020 | Shpurov et al. | |
| 2020/0084027 A1 | 3/2020 | Duchon et al. | |
| 2021/0019971 A1* | 1/2021 | Martin | H04L 9/0822 |

FOREIGN PATENT DOCUMENTS

| | | |
|---|---|---|
| WO | 0184906 A2 | 11/2001 |
| WO | 2006/047694 A1 | 5/2006 |
| WO | 2014190323 A1 | 11/2014 |
| WO | 2018127606 A1 | 7/2018 |

OTHER PUBLICATIONS

"Bitcoin Explained Like You're Five Part 3-Cryptography", https://chrispacia.wordpress.com/2013/09/07/bitcoin-cryptography-digital signatures-explained/, 2013, (21 pages).

"blockchainCreate", http://blockchain.info:80/wallet/faq, dated Jan. 9, 2012, (5 pages).

"How to sell Lindens" dated Mar. 6, 2013 (Year: 2013).

"Off-the-chain transactions", downloaded from http://gavintech.blogspot.com/2012/07/off-chain-transactions.html, dated Jul. 3, 2012 (Year: 2012), (4 pages).

"Securing your wallet", download from https://bitcoin.org/en/secure-yourwallet (post from 2013), (4 pages).

"Send bitcoins to an unknown recipient", Feb. 13, 2011, downloaded from https://bitcointalk.org/index.php?topic=3427.0, (Year: 2011).

"Send Bitcoins to Email Addresses!", Jan. 9, 2012, downloaded from https://web.archive.org/web/20120109084110/http://www.bitcoinmail.com/, merged and attached as PDF file, (Year: 2012).

"Transaction Fees ("Transaction fees and negative balances"")", downloaded from https://bitcointalk.org/index.php?topic=6856.0 dated Apr. 30, 2011-May 1, 2011, (Year:2011), (3 pages).

"Wholesale Payment Systems: Interbank Payment and Messaging System, Fedwire and Clearing House Interbank Payment Systems (CHIPS)", http://www.ffiec.gov/ffiecinfobase/booklets/Wholesale/02.html, Dec. 16, 2005, (3 pages).

"You Can Now Send Bitcoins over Email with Tip Bot", Feb. 26, 2014, downloaded from https://www.coindesk.com/can-how-send-bitcoins-email-tip-bot,' (Year: 2014).

Beal, Alex, "Backing Up Sensitive Data With Secret Sharing", downloaded from https:www.usrsb.in/secret-sharing-backup.html, dated Feb. 23, 2013) (Year: 2013), (8pages).

Bitcoin Explained ("Bitcoin Explained Like You're Five, Part 4-Securing Your Wallet," bitcoin-explained-like-youre-five-part-4-securing-your-wallet/ attached as PDF file, dated Sep. 29, 2013) (Year: 2013) https://chrispacia.wordpress.com/2013/09/29/.

Computer Arch (http://www.math.uaa.alaska.edu/~afkjm/cs101 /handouts/ComputerArch.pdf attached as pdf, dated Sep. 10, 2009).

Dion, Derek A., "I'll gladly trade you two bits on Tuesday for a byte today: Bitcoin, regulating fraud in the e-conomy pf Hacker-cash", Journal of Law, Technology & Policy, vol. 2013, 2013, pp. 165-201.

Doguet, Joshua J., "The Nature of the Form: Legal and Regulatory issues surrounding the Bitcoin digital currency system", Louisiana Law Review, vol. 73, No. 1, Summer 2013, pp. 1118-1153.

International Search Report and Written Opinion for PCT Application No. PCT/US2019/027857 mailed Jul. 15, 2019.

Meiklejohn, Sarah et al., "A fistful of bitcoins: Characterizing Payments among men with no names", 2013, (8 pages).

NIST (Archived NIST Technical Series Publication, dated Jul. 2012, "sp800-57 _part1_rev3_general.pdf", attached as pdf.).

Wallace, Benjamin , "The rise and fall of bitcoin", Magazine, WIRED, https://www.wired.com/2011 /11 /mf_bitcoin/all/1., Nov. 23, 2011, pp. 1-17.

"Blockchain ("How do off chain transactions work?" downloaded from https://bitcoin.stackexchange.com/questions/123530/how-do-off-chain-transactions-work, year 2013.".

"Coin Selection Algorithm—What is the coin selection algorithm", downloaded from https://web.archive.org/web/20130228073524/https://bitcoin.stackexchange.com/questions/1077/what-is-the-coin-selection-algorithm dated Feb. 27, 2014.

"GitHub for SelectCoin code", https://github.com/trottier/original-bitcoin/blob/master/src/main.cpp, lines 2410-2510, dated Apr. 4, 2013.

"How Bitcoin Works, downloaded from https://www.forbes.com/sites/investopedia/2013/08/01/how-bitcoin-works/#284bd94a17ff, dated Aug. 1, 2013, attached as PDF file. (Year: 2013)".

"Inputs.io FAQ", https://inputs.io/faq, 2013.

"International Search Report and Written Opinion of the ISA dated Dec. 18, 2019 for PCT/US19/52371."

"Multi-Party Threshold Signature Scheme", https://github.com/binance-chain/tss-lib#readme.

"NPL4, Importing Bitcoin from a paper wallet into Electrum", https://thecleverest.com/, dated Mar. 12, 2014.

"Proactive secret sharing", Wikipedia, https://en.wikipedia.org/wiki/Proactive_secret_sharing.

"Strongcoin—The safest Bitcoin e-wallet on the planet", https://www.javaworld.com/article/2078467/bitcoin-for-beginners-part-2--bitcoin-as-a-technology-and-network.html, year 2013.

"Whose bank account is it anyway?", McMillan LLP, Jun. 24, 2011, downloaded from http://www.lexology.com/library/detail.aspx?g20the%20parties.attached as PDF file (Year: 2011).

Antonopoulos, Andreas M., "Mastering Bitcoin Unlocking Digital Crypto-Currencies", 2014.

Bernstein, Daniel J., "Curve25519: new Differentiations-Hellman speed records", 9th International Conference on Practice and Theory in Public-Key Cryptography, New York NY, USA, Apr. 24-26, 2006, Proceedings pp. 207-228, (Lecture Notes in Computer Science; vol. 3958), https://cr.yp.to/ecdh/curve25519-20060209.pdf.

Berstein, Daniel J., et al., "High-speed high-security signatures", Journal of Cryptographic Engineering vol. 2, pp. 77-89(2012), Published: Aug. 14, 2012.

Bradbury, Danny , "BitGo Safe Aims to Secure Bitcoin Wallets with Multi-Signature Transactions", CoinDesk, The Voice of Digital Currency, http:/web.archive.org/web/20140108021304/http://www.coindesk.com/, published Dec. 19, 2013.

Breitner, Joachim , et al., "Biased Nonce Sense: Lattice Attacks against Weak ECDSA Signatures in Cryptocurrencies", Financial Cryptography and Data Security, pp. 3-20, DOI: 10.1007/978-3-030-32101-7_1, Sep. 2019.

Davis, Don , "Defective Sign & Encrypt in S/MIME, PKCS#7, MOSS, PEM, PGP, and XML", The Proceedings of the 2001 UNSENIX Annual Technical Conference, Jun. 25-30, 2001, Boston, Massachusetts, USA, pp. 65-78 of the Proceedings.

Gennaro, Rosario , et al., "Revisiting the Distributed Key Generation for Discrete-Log Based Cryptosystems", https://pdfs.semanticscholar.org/642b/d1bbc86c7750cef9fa770e9e4ba86bd49eb9.pdf, 2003.

Krawczyk, H. , et al., "HMAC-based Extract-and-Expand Key Derivation Function (HKDF)", Internet Engineering Task Force (IETF), May 2010, https://tools.ietf.org/html/rfc5869.

Lee, Leland , et al., "Alternative Signatures Schemes", Medium, Feb. 12, 2019, https://medium.com/blockchain-at-berkeley/alternative-signatures-schemes-14a563d9d562.

Marlinspike, Moxie , et al., "The X3DH Key Agreement Protocol", Signal, Revision 1, Nov. 4, 2016.

Merkel, Dirk , "Bitcoin for beginners, Part 2: Bitcoin as a technology and network", Javaworld, Dec. 6, 2011.

(56) References Cited

OTHER PUBLICATIONS

Neuman, Nick, "KeySplit-Tackling the hard parts of being your own bank", https://medium.com/@nickneuman/keysplit-private-key-security-for-cryptocurrency-owners-d1653ea9631d, Feb. 24, 2018.

International Search Report and Written Opinion for application No. PCT/US20/055949, dated Jan. 15, 2021.

Rothenberger, Benjamin, et al., "Internet Kill Switches Demystified", Proceedings fo the 10th European Workshop on Systems Security, Apr. 23, 2017.

Nov. 19, 2021—(EP) European Extended Search Report—App. No. 19787749.1.

"How do YOU store a digital backup of your bip39 mnemonic?", https://www.reddit.com/r/Bitcoin/comments/58zst0/how_do_you_store_a_digital_backup_of_your_bip39/, posted by udaggertreatment 4 years ago, May 2017.

Altimore, Pat, et al., "Azure Blockchain Workbench architecture", https://docs.microsoft.com/en-us/azure/blockchain/workbench/architecture#transaction-builder-and-signer, Azure Blockchain, Microsoft Docs, Sep. 5, 2019.

Baldwin, M., et al., "Quickstart: Set and retrieve a secret from Azure Key Vault using the Azure portal", https://docs.microsoft.com/en-us/azure/key-vault/secrets/quick-create-portal, Azure Quickstart, Microsoft Docs, Sep. 3, 2019.

Bauer, Roderick, "Securing Your Cryptocurrency", Backblaze, May 10, 2018.

Kasarabada, Lavanya, "Announcing Storage Service Encryption with customer managed keys general availability", https://azure.microsoft.com/en-us/blog, posted Mar. 7, 2018.

Swanson, William, et al., "A Single-Sign-On Security Platform for Private and Decentralized Applications", https://edge.app/wp-content/uploads/2019/01/Edge-White-Paper-1-22-2019.pdf, Edge, White Paper, Jan. 22, 2019.

\* cited by examiner

OFFLINE STORAGE SYSTEM AND METHOD OF USE

CROSS-REFERENCE TO RELATED APPLICATIONS

This application claims priority to U.S. Provisional Application No. 62/658,856 filed 17 Apr. 2018 and U.S. Provisional Application No. 62/687,157 filed 19 Jun. 2018, which are each incorporated herein in its entirety by this reference.

This application is related to U.S. application Ser. No. 14/660,331 filed 17 Mar. 2015, which claims priority from U.S. Provisional Patent Application No. 61/954,434, filed on 17 Mar. 2014; U.S. Provisional Patent Application No. 61/990,017, filed on 7 May 2014; U.S. Provisional Patent Application No. 62/042,676, filed on 27 Aug. 2014; U.S. Provisional Patent Application No. 62/056,100, filed on 26 Sep. 2014; U.S. Provisional Patent Application No. 62/086,669, filed on 2 Dec. 2014 and U.S. Provisional Patent Application No. 62/099,992, filed on 5 Jan. 2015, each of which is incorporated herein in its entirety by this reference.

TECHNICAL FIELD

This invention relates generally to the key security field, and more specifically to a new and useful key distribution and storage system and method of use in the key security field.

BACKGROUND

Cryptocurrency addresses (e.g., blockchain addresses, cryptocurrency addresses) oftentimes have one or more private keys that can be used to sign transactions for asset transfer from the address. Because the private key allows an entity to spend the assets within the wallet, securing the private key is oftentimes desirable.

Furthermore, when an address is associated with extremely valuable assets, it is oftentimes desirable to implement a multi-signature security scheme, where multiple keys from multiple owners are required before a transaction from the address can be signed. However, conventional multi-signature schema oftentimes require that the key holders be anonymized or that the key holders for a wallet not be known to an attacker, since the attacker could gain access to the wallet by obtaining the requisite keys from the known key holders.

Additionally, conventional multi-signature schemes are currency-specific, and cannot be universally applied across multiple blockchains.

Thus, there is a need in the key security field to create a new and useful key storage and distribution system and method of use. This invention provides such new and useful system and method of use.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
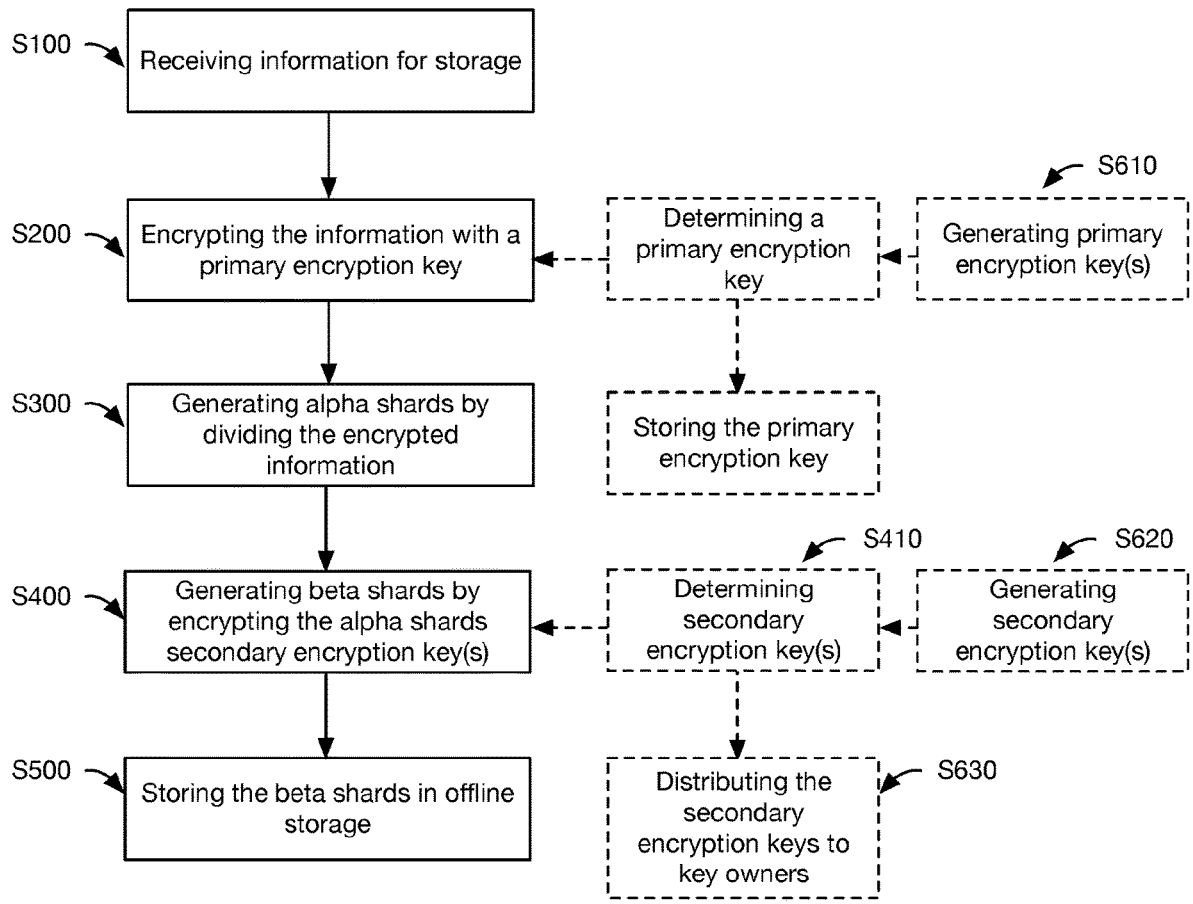
FIG. 1 is a flowchart representation of the key securing method.

As shown in FIG. 1, the method includes: receiving information for storage S100; encrypting the information S200; generating alpha shards by dividing the encrypted information S300; generating beta shards by encrypting the alpha shards with the secondary encryption keys S400; and storing beta shards in offline storage S500. The method can optionally include distributing the secondary encryption keys to the key holders.

The method functions to provide cold storage for information, such as cryptocurrency information (e.g., a cryptocurrency private key of a cryptocurrency public-private key pair). The method can optionally function to provide a multisignature blockchain transaction authorization scheme (e.g., M-of-N transactions), or be otherwise used.

Figure 2:
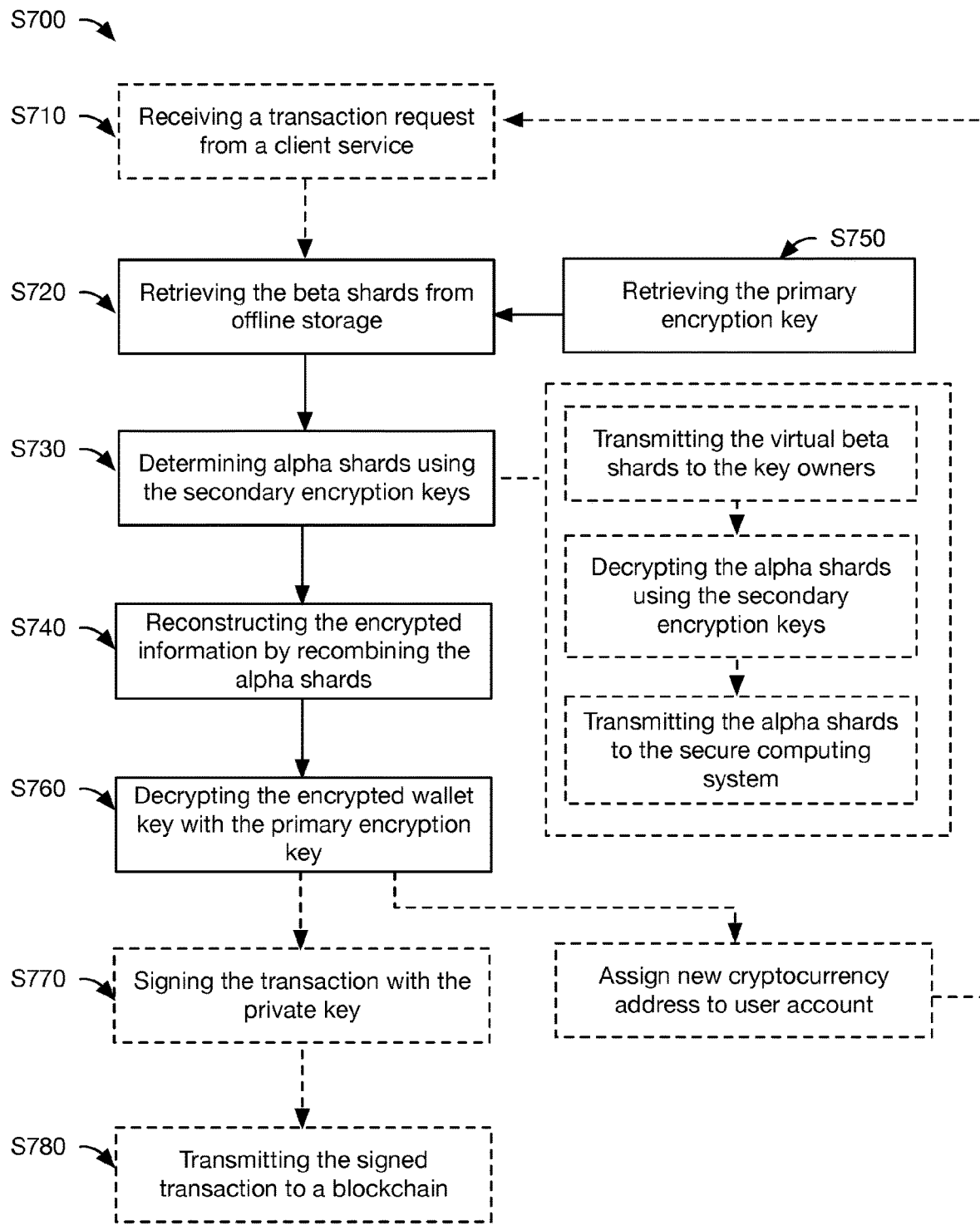
FIG. 2 is a flowchart representation of multisignature transaction signing using the stored cryptocurrency private key.

As shown in FIG. 2, the method can additionally or alternatively include restoring the stored information S700, which functions to allow the key holders to cooperatively transact from the wallet. Restoring the stored information can include: retrieving the beta shards from offline storage S720; determining alpha shards using the secondary encryption keys S730; reconstructing the encrypted information by recombining the regenerated alpha shards S740; retrieving the primary encryption key S750; and decrypting the encrypted information with the primary encryption key S760. In variants, the method can optionally include: receiving a transaction request from client service S710; signing the transaction with the cryptocurrency private key S770; and transmitting the signed transaction to the blockchain S780.

The cryptocurrency protocol(s) that this method can be used with can include: Bitcoin, Ethereum, Litecoin, Ripple, Bitcoin cash, EOS, and/or any suitable cryptocurrency.

In one variation, storing the information includes: generating a cryptocurrency public-private key pair associated with a cryptocurrency address; encrypting the cryptocurrency private key with a primary encryption key; sharding the encrypted private key into a set of alpha shards (e.g., using a sharding algorithm, such as Shamir's Secret Sharing Scheme); encrypting the alpha shards with secondary encryption keys (e.g., public secondary encryption keys from each of a set of asymmetric key pairs) to generate beta shards; and storing the beta shards offline (e.g., in a physical repository, in cold storage). The method can optionally include storing the primary encryption key and discarding the virtual representations of: the cryptocurrency private key, the encrypted cryptocurrency private key, the alpha shards, and the beta shards.

In this variation, the primary encryption key is preferably a symmetric key, wherein the private key is preferably encrypted using symmetric-key cryptography (e.g., AES), but can alternatively or additionally be encrypted using any other suitable encryption algorithm. The secondary encryption keys preferably include a set of secondary asymmetric encryption key pairs, wherein each pair includes a public key (e.g., encryption key, public secondary key, public key of the secondary encryption key pair) and a private secondary encryption key (e.g., decryption key, private secondary key, private key of the secondary encryption key pair) corresponding to the public key. However, the secondary encryption keys can be symmetric keys or be any other suitable set of keys. The alpha shards are preferably encrypted using the public secondary encryption keys using public-key cryptography (e.g., using an asymmetric encryption algorithm, such as RSA), but can alternatively be encrypted using any suitable algorithm. The public secondary encryption keys can be stored by the secure computing system for subsequent reuse (e.g., to encrypt another set of alpha shards). The private secondary encryption keys are preferably distributed to a set of predetermined, geographically dispersed key holders (key owners), wherein the key holders can decrypt beta shards (encrypted using the corresponding public secondary encryption key) into alpha shards using the private secondary encryption key, but can be otherwise stored (e.g., in a lockbox, etc.).

In a specific example, the method includes: generating a cryptocurrency private key, encrypting the cryptocurrency private key with an alpha key (e.g., an AES key), sharing the alpha ciphertext with a secret sharing technique (e.g., Shamir's) to create alpha shards, encrypting each alpha shard to a key holder's public key to create beta shards, and storing the beta ciphertext offline.

In one variation, recovering the stored information S700 includes: receiving an unsigned transaction from a client service, the unsigned transaction identifying a cryptocurrency address; restoring beta shards associated with the cryptocurrency address from cold storage; transmitting the beta shards to key holders associated with the cryptocurrency address, wherein the key holders decrypt the beta shards into alpha shards using their respective private secondary encryption keys; receiving the alpha shards from the key holders; reconstructing the encrypted cryptocurrency private key from the received alpha shards; decrypting the encrypted cryptocurrency private key using the primary encryption key associated with the cryptocurrency address; and signing the transaction with the decrypted cryptocurrency private key. S700 can optionally include managing the restored private key.

In a specific example, the method includes: retrieving beta shards from offline storage, decrypting each beta shard with the respective key holder's private key to create alpha shards, combining the alpha ciphertext with the secret sharing technique (e.g., Shamir's) to recreate the encrypted cryptocurrency private key, decrypting the encrypted cryptocurrency private key with the alpha key (e.g., the AES key), and optionally signing a transaction with the decrypted cryptocurrency private key.

All or portions of the method are preferably performed in response to receipt of a storage instruction and/or a retrieval request but can alternatively or additionally be performed upon generation of the information, or at any other suitable time or frequency. The method is preferably repeated for each of a plurality of information received for storage (e.g., each of a plurality of private keys), but can alternatively be performed for a subset of the information (e.g., a subset of the private keys, a portion of the information, etc.) or performed any suitable number of times.

2. Benefits

The method can confer several benefits over conventional cryptocurrency private key securing methods. First, the method leverages multisignature transaction authorization schemes, which can prevent a single point of failure, by distributing keys to multiple owners (users, key holders, "sages").

Second, variants of the method can be more secure than conventional secret sharing schemes because, instead of distributing cryptocurrency private keys (or cryptocurrency private key segments) to the key holders, the method distributes encryption keys (secondary encryption keys) for the key holders to retain, control, and use. This means that the enduring information—which is more subject to attack—are encryption keys that cannot directly sign (entirely or partially) a transaction from a wallet. Furthermore, in some variants, the key holders can be geographically distributed, which can further increase the security of the system. This further allows key generation ceremonies to be run without interacting with the key holders.

Third, variants of the method can be easier to use than conventional systems because encryption keys are distributed in lieu of cryptocurrency private keys or key segments. In particular, when a user-held encryption key is compromised, the method can simply generate a new encryption key for the key holder, re-encrypt the respective cryptocurrency private key segment (or encrypted version thereof) based on the new encryption key (e.g., using the public key of a key pair), and distribute the new encryption key (e.g., the private key of the key pair) to the key holder. This also allows key holders to be easily changed (e.g., rotated) without leaking sensitive information by changing the public key used to encrypt the alpha shards. Furthermore, in some variants, the key segments can be redundantly stored, such that multiple copies of the same key segment can be stored in different offline storage facilities, which can be geographically distributed to reduce localized risk.

Fourth, variants of the method enable the system to scale, because each user can use the same encryption key to (cooperatively) access multiple wallets. In particular, when a user (e.g., key holder) has access or control over multiple wallets, the same encryption key can be used to encrypt the cryptocurrency private key segments from different wallets. This minimizes the amount of secret information that the key holder needs to hold and maintain, which can reduce user confusion and physical security expenses.

Fifth, variants of the method can be more secure by decreasing the amount of time that sensitive information exists as virtual information, or by decreasing the amount of time that sensitive information exists outside of a secure environment. In particular, because the key holders hold encryption keys and not cryptocurrency private keys, the system can transmit an encrypted cryptocurrency private key segment to the key holder, wherein the key holder system decrypts the encrypted cryptocurrency private key segment. The key holder system can then send the decrypted cryptocurrency private key segment to a reconstruction system, wherein the reconstruction system reconstructs the cryptocurrency private key (or derivative thereof) from the decrypted cryptocurrency private key segments received from the multiple users. The decrypted cryptocurrency private key segment can be, itself, encrypted, wherein the cryptocurrency private key can be encrypted using other key(s) aside from the key holder's encryption key (example shown in FIG. 4).

This can confer increased security by minimizing the amount of time that the decrypted cryptocurrency private key segment and encrypted cryptocurrency private key segment are outside of a secure environment. This can also confer increased security by increasing the security of the exposed information—the encrypted cryptocurrency private key—by multiple-encrypting each cryptocurrency private key segment, such that the transmitted information—the decrypted cryptocurrency private key—is not fully decoded. This can also relax the intra-user anonymity requirement in conventional methods. This can also confer increased security by only transiently storing sensitive information, such as digital versions of the beta shards, any internal encryption keys, the encrypted cryptocurrency private key segment, and the decrypted cryptocurrency private key segment (e.g., until use, in volatile memory).

However, the method can confer any suitable set of benefits over conventional systems.

3. System

Figure 3:
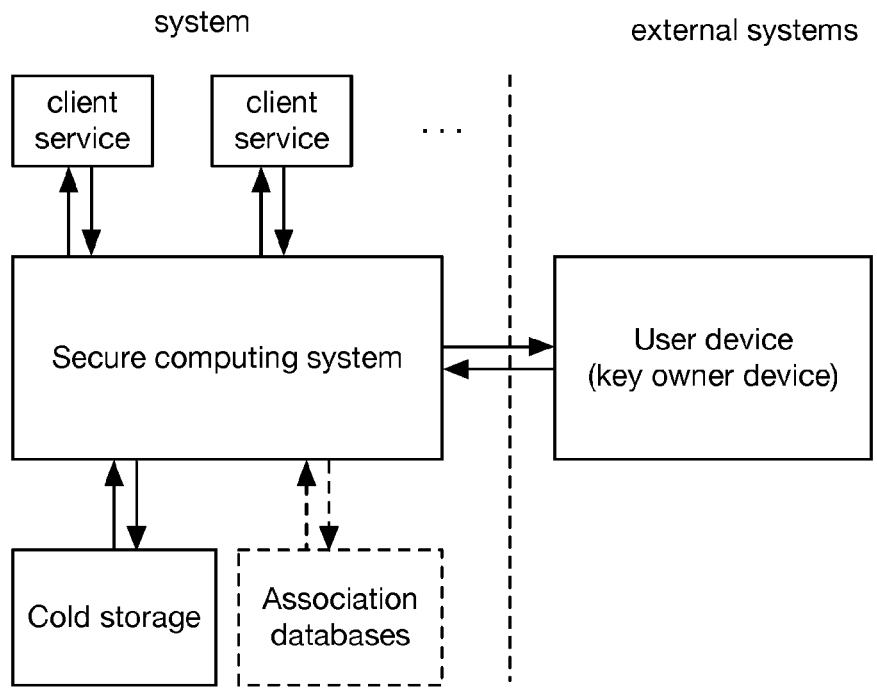
FIG. 3 is an example of a system used by the method.

The method is preferably performed by a system including: a key storage system and offline storage, and can optionally include a secure computing system, a client services, a key holder interface, and/or any other suitable system (example shown in FIG. 3), but can additionally or alternatively be performed by any other suitable system.

All or portions of the method can be performed by the same or different system or subsystem. The systems preferably include volatile memory and/or transitory memory (e.g., RAM), but can alternatively or additionally include nonvolatile memory and/or non-transitory memory. Lateral access between components of the system and/or any auxiliary systems preferably requires a token (e.g., an API key, SSL keys, etc.), but can be otherwise restricted or unrestricted.

The key storage system functions to process the received information (e.g., cryptocurrency private keys) into a format suitable for offline storage (offline storage format). The key storage system preferably performs S100-S500, but can additionally or alternatively perform a subset of S100-S500 (e.g., perform only S100-S400, generate the digital precursor to the offline storage format, etc.), generate the information, or perform any other suitable set of processes. The key storage system preferably includes a set of processing systems (e.g., CPUs, GPUs, etc.) and volatile and/or transitory memory (e.g., RAM, etc.), but can additionally or alternatively include nonvolatile and/or non-transitory memory (e.g., flash memory, USB drives, etc.). In variants, the information can be processed into the offline storage format by the processing systems on volatile memory, wherein the instructions for information processing can be stored on the non-volatile memory. However, the key storage system can include any other suitable set of components. Examples of the key storage system can include: a computer or laptop (e.g., with the hard drive and networking chips removed or intact), a remote computing system (e.g., server system), a smartphone, a tablet, a smartwatch, and/or any other suitable computing system. The key storage system is preferably separate from the secure computing system, but can alternatively be the same as the secure computing system.

The system can optionally include a key generation system that generates one or more pieces of cryptocurrency information for one or more cryptocurrency protocols (e.g., using the respective protocol's key generation ceremony). The key generation system can be the same system as the key storage system (e.g., such that the cryptocurrency private key never leaves the computing system intact), be a module running on the key storage system, or be a different system. For example, the key storage system can generate the cryptocurrency key pairs (e.g., on volatile memory), store the cryptocurrency private keys of each cryptocurrency key pair using S100-S500, and optionally store the cryptocurrency public keys in non-volatile memory, which can be transferred to the secure computing system for later use.

The cryptocurrency information can include public-private key pair(s) and/or any other suitable information. The cryptocurrency public-private key pairs (cryptocurrency key pair) can be generated using SHA3-256, Keccak-256, any suitable cryptographic hash function associated with any suitable cryptocurrency, or any other suitable cryptographic algorithm. For example, the cryptocurrency information is generated using the key ceremony disclosed in U.S. application Ser. No. 15/647,889 filed 2017 Jul. 12 or the key generation method disclosed in U.S. application Ser. No. 14/660,307 filed 2015 Mar. 17, each of which are incorporated herein in their entireties by this reference. However, the cryptocurrency information can be otherwise generated. The generated cryptocurrency information is preferably specific to a given cryptocurrency protocol (e.g., the cryptocurrency associated with the cryptographic algorithm that was used), but can alternatively be associated with other cryptographic assets, fiat, or any other suitable asset.

The secure computing system functions to perform all or a portion of S700, and can additionally or alternatively perform any other suitable set of functionalities. In variants, the secure computing system can: store the primary encryption key(s) (alpha keys), reconstruct the encrypted private key, decrypt the reconstructed encrypted private key, and sign transactions. The secure computing system can optionally assign pre-generated public-private key pairs to user accounts (e.g., upon opening an account, as the output of a UTXO transaction, etc.), and/or store the associations between the key pairs and user accounts (e.g., store the information identifier in association with the user account). The secure computing system can optionally store key holder information (e.g., identifiers, account information, contact information, out-of-band verification information, etc.) in association with: information associated with their respective secondary encryption key(s) (e.g., the public key corresponding to the key holder's secondary encryption key, an identifier for the secondary encryption key, etc.); the beta shards that the key holders are associated with (e.g., beta shards encrypted with the secondary encryption key and/or public key associated with the secondary encryption key), or any other suitable information. The secure computing system can optionally store retrieval information for a cryptocurrency private key, such as the cryptocurrency private key identifier, identifier(s) for the primary encryption key, identifiers for the respective beta shards, identifiers for the secondary encryption keys, the key holders of the secondary encryption keys, and/or any other suitable retrieval information.

The secure computing system is preferably a secure environment or clean room, but can alternatively be a distributed system, an unsecured environment, or be any other suitable computing environment. The secure computing system can be a singular system, or be split into sub-systems, wherein lateral access between the sub-systems requires tokens or other access. The secure computing system can be hosted in a remote computing system (e.g., remote server system, the cloud), be hosted on-premises (e.g., of a trusted provider), or otherwise hosted. The secure computing system is preferably a cold system (e.g., offline or transiently connected to a communications network), but can alternatively be a hot system (e.g., connectable or connected to a communications network, the Internet, etc.), or be otherwise configured.

The client services functions to interface between the secure computing system and the blockchain(s) and/or the blockchain services (e.g., services that interface between an off-chain system, such as a user device, and the blockchain). For example, the client services can receive unsigned transactions from the blockchain or blockchain services, transmit the unsigned transactions to the secure computing system for signature, receive the signed transaction from the secure computing system, and transmit the signed transaction to a blockchain, blockchain service (e.g., the source or another blockchain or blockchain service), or other endpoint. The client services is preferably separate from the secure computing system, but can alternatively be a part of the secure computing system. The client services can be hosted in a remote computing system (e.g., remote server system, the cloud), be hosted on-premises (e.g., of a trusted provider), or otherwise hosted.

The offline storage (cold storage, physical repository, physical vault) functions to store offline versions of the beta shard (e.g., multi-encrypted version of a cryptocurrency private key segment). The offline storage is preferably air-gapped, but can alternatively be connected to a data network. The offline storage is preferably maintained by the entity maintaining the secure computing system and/or client services, but can alternatively be maintained by one or more third parties. The offline storage can include one or more physical repositories. Examples of the physical repositories can include: binders, libraries, safe deposit boxes, safes, vaults, or any other suitable physical repository. The physical repositories can be geographically distributed (e.g., separated by a threshold distance), geographically collocated, or otherwise distributed.

The beta shard information (e.g., beta shard string, etc.) is preferably stored in an offline storage format (offline representations) on or in a physical representation that is physically separated from the secure computing system and/or client services, but can be otherwise stored. The beta shard information can be stored in virtual (e.g., analog, digital) format, physical format, and/or any other suitable format. Examples of offline storage formats that can be used include: text strings, non-human-readable formats encoding the beta shard (e.g., QR codes, bar codes, etc.), audio signals, light signals, or any other suitable storage format. The offline storage format can additionally or alternatively store auxiliary information, such as: the cryptocurrency private key identifier, the primary encryption key used to encrypt the alpha shard precursors, the secondary encryption key used to encrypt the beta shard (e.g., the secondary public key), the key holder identifier associated with the aforementioned secondary encryption key, and/or any other suitable information.

The beta shard information is preferably stored in a physical medium (physical representation), but can be stored in any suitable medium. Examples of physical mediums that can be used to store the beta shard information include: physical HSMs (hardware security modules), security tokens, bearer items, other data storage mediums (e.g., encrypted, password protected, biometrically-secured, or otherwise secured), paper (e.g., wherein the beta shard can be stored as text, as a QR code, as a bar code, or in any other suitable data representation format), or any other suitable physical medium (e.g., cold storage mechanism). One or more copies of the beta shard information can be stored in one or more offline storage repositories.

The information for each beta shard is preferably stored in a physical medium instance that is separate and distinct from the physical medium instance storing information for other beta shards (e.g., in separate HSMs, on separate pieces of paper, etc.), but can alternatively or additionally be stored as a batch (e.g., wherein the information for multiple beta shards are stored in a common physical medium instance) or otherwise stored. The physical medium instance can be identified with the information identifier (e.g., private key identifier), but can be otherwise identified.

The system can optionally include a key holder interface. The key holder interface functions to enable the key holder (key holder, sage) to interface with the secure computing system and/or other portions of the system. The key holder interface is preferably a physical user device of the key holder (e.g., laptop, smartphone, HSM, etc.), but can be any other suitable system. The key holder interface is preferably a cold wallet, but can alternatively be a hot wallet. The key holder interface preferably includes memory (e.g., non-volatile memory) that stores the secondary encryption keys associated with the key holder, but can alternatively store a single encryption key, cryptocurrency private key segments, or any other suitable information. The secondary encryption keys that are stored are preferably the secondary private keys (of the secondary asymmetric key pair), but can alternatively or additionally be a secondary symmetric key, or be any other suitable encryption key. The key holder interface can optionally present information from the unsigned transaction to the key holder (e.g., the transaction endpoint, amount, time, etc.), enable the key holder to request the beta shards (e.g., wherein the key holder interface can optionally store the identifiers for the beta shards encrypted by the respective secondary encryption key), enable the key holder to decrypt the beta shards, and/or perform any other suitable functionality.

The method can optionally be performed with a management account, which functions to control cryptocurrency private key access and use. In particular, the management account can: specify the number of secondary encryption keys that should be generated, control secondary encryption key distribution, specify the number of shards to be generated, specify the number of times the cryptocurrency private key(s) are divided, specify the number of encryption levels when using a cascade encryption scheme, specify the number of decrypted shards needed to regenerate the cryptocurrency private key(s), control whether a transaction can be signed, or have any other suitable control over private key access and use.

The management account is preferably associated with an owner entity, wherein the owner entity is preferably an institution, such as a bank or brokerage, but can alternatively be an individual, or be any other suitable entity. The owner entity is preferably associated with one or more owner accounts (user accounts), wherein the owner accounts can be associated with the cryptocurrency key pairs associated with the owner entity's cryptocurrency assets. The owner entity is preferably associated with a plurality of users (e.g., the key holders, alternatively other users) that manage the assets associated with the cryptocurrency address, but can alternatively be associated with a single user. The key holders can be associated with the owner entity (e.g., be employees of the owner entity), be associated with a third party custodial entity (e.g., associated with the entity managing the secure computing system and/or key storage system, etc.), be independent agents, or be otherwise associated with the owner entity. Each of the key holders can be associated with a key holder account or user identifier, which can be stored by the system (e.g., by the secure computing system, a user database, etc.) in association with the management account, the cryptocurrency address(es) for which the key holder has a secondary encryption key, an endpoint (e.g., key holder interface address, URI, etc.), password (e.g., alphanumeric, biometric, etc.), or with any other suitable information.

4. Method a. Storing Information in Offline Storage.

Receiving information for storage S100 functions to receive information for cold storage. S100 is preferably performed after information generation (e.g., immediately after information generation), but can alternatively or additionally be performed at any suitable time. S100 is preferably performed by the key generation system, but can alternatively or additionally be performed by the secure computing system or by any suitable system.

The information is preferably cryptocurrency information, such as the cryptocurrency private key of a cryptocurrency key pair, but can alternatively be data, text, video, images, or be any other suitable information. Hereinafter, all references to private keys can be equally applicable to any information to be stored.

The cryptocurrency private key can be associated with an identifier (private key identifier, cryptocurrency private key identifier) that uniquely identifies the private key for later retrieval, but can be otherwise identified. For example, the cryptocurrency private key can be associated with: a key pair identifier (e.g., key pair index), the corresponding private key, a cryptocurrency address (e.g., a hash of the corresponding public key), a digital wallet, a user identifier or account, and/or any other suitable identifier. The association between the cryptocurrency private key identifier and any other identifier (e.g., user account) can be stored by the system, by the user, by the user device (e.g., smartphone, hardware storage module (HSM), laptop, etc.), or by any other suitable system.

The cryptocurrency private key is preferably received from an information source, such as the key generation system, a user device, the processor(s) generating the information (e.g., the public-private keypair), or any other suitable information source. The information can be received: in real- or near-real time, as the information is generated; upon retrieval by the system (e.g., in response to receipt of a storage request); upon transmission from the information source; or at any other suitable time.

The cryptocurrency private key can be generated at any suitable time in any suitable manner.

In a first variation, the public-private key pair is generated in response to receipt of an endpoint creation request (e.g., wallet creation request, cryptocurrency address creation request) from a management account, but can alternatively or additionally be created when a prior wallet balance meets a predetermined condition (e.g., exceeds a threshold value), after a transaction has been signed, after the cryptocurrency address was used, or upon occurrence of any other suitable event. The cryptocurrency information is preferably created by the key generation system, but can alternatively be created by the secure computing system, a user device, the client services, or by any suitable system.

In a second variation, a plurality of cryptocurrency public-private key pairs are generated as a batch (e.g., in parallel, in a key generation session, etc.). In this variation, the private keys for each of the key pairs can be stored in offline storage (e.g., individually, as a batch, etc.) using this method, or otherwise stored. In one example, a plurality of cryptocurrency key pairs are generated in a batch, wherein the system can assign user accounts a pre-generated key pair upon occurrence of an assignment event (e.g., new user signup, as a transaction output, such as a change address). In a specific example, the secure computing system can assign the cryptocurrency public key and/or cryptocurrency address (of the pre-generated key pair) to the user account. In a second example, a plurality of cryptocurrency key pairs are generated in a batch for a single owner entity (e.g., a single customer, a bank, etc.). In this example, the secondary encryption keys used to encrypt cryptocurrency key pairs can be associated with the owner entity.

However, the key pairs can be generated in any suitable manner at any suitable time.

Encrypting the information S200 functions to encode the information. S200 is preferably performed upon performance of S100, but can additionally or alternatively be performed after each cryptocurrency private key decryption, each transaction signing, each iteration of S700, or at any suitable time. S200 is preferably performed by the key generation system, but can additionally or alternatively be performed by the secure computing system or by any suitable system. S200 is preferably individually performed for each piece of information, but can alternatively or additionally be performed for a batch of information, or performed for any other suitable set of data and/or at any suitable frequency.

Encrypting the information 200 preferably includes encrypting the cryptocurrency private key of the cryptocurrency key pair, but can additionally or alternatively include encrypting any other suitable information.

The information (e.g., cryptocurrency private key) is preferably encrypted using the primary encryption key, but can additionally or alternatively be encrypted using any other suitable encryption key. The primary encryption key is preferably pre-generated and retrieved from storage, but can additionally or alternatively be generated when the information is to be encrypted.

Figure 5:
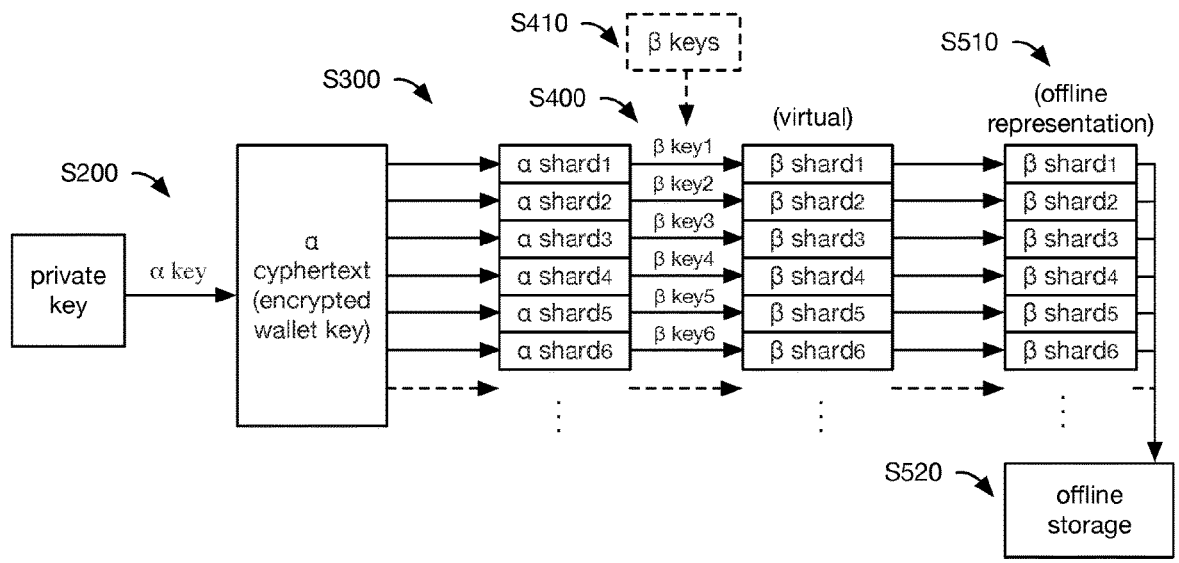
FIG. 5 is a schematic representation of a variation of the method for storing a cryptocurrency private key.

As shown in FIG. 5, the entire private key (cryptocurrency private key) is preferably encrypted; alternatively, the private key can be fragmented (e.g., sharded) prior to encryption, wherein the cryptocurrency private key fragments (e.g., shards) can be encrypted. The encrypted cryptocurrency private key (alpha cyphertext, primary cyphertext) is preferably generated by encrypting each private key (cryptocurrency private key) with one or more primary encryption keys (alpha encryption key), but can alternatively or additionally be tokenized or be otherwise generated. The cryptocurrency private key is preferably encrypted once with the primary encryption key, but can alternatively be encrypted multiple times using multiple primary encryption keys and/or encryption algorithms.

Generating alpha shards by dividing the encrypted information S300 functions to split the encrypted information. In one example, S300 includes generating alpha shards by sharding the encrypted cryptocurrency private key.

S300 is preferably performed after S200, but can alternatively be performed at any suitable time. S300 is preferably performed by the key storage system, but can additionally or alternatively be performed by the secure computing system, by an external system (e.g., the key holder device) or by any other suitable computing system. S300 is preferably performed once on the encrypted cryptocurrency private key, but can alternatively be performed multiple times on each encrypted cryptocurrency private key (e.g., wherein the alpha shards are divided).

The encrypted information is preferably divided (e.g., fragmented, sharded, etc.) into the alpha shards using a secret sharing technique, but can be divided according to a set of rules (e.g., divided evenly, divided using a sliding window, etc.), or otherwise divided. The secret sharing technique can be secure or insecure, fair or unfair, proactive, verifiable or unverifiable, multi-secret (e.g., k of n sharing) or single-secret, or have any suitable parameters. Examples of secret sharing techniques that can be used include: Shamir's Secret Sharing, Blakley's secret sharing, Chinese remainder theorem (Mignotte's and Asmuth-Bloom's schemes), or any other suitable secret sharing technique.

Each resultant alpha shard (encrypted cryptocurrency private key fragment or shard) is preferably a subset of the encrypted cryptocurrency private key (e.g., less than the entirety of the encrypted cryptocurrency private key), but can be otherwise related to the encrypted cryptocurrency private key. S300 preferably generates a plurality of alpha shards from the same encrypted cryptocurrency private key, but can alternatively generate a single alpha shard or include any suitable number of alpha shards. The number of alpha shards (N) can be determined by: the management account, be predetermined, be a minimum number of fragments, be determined based on the number of key holders (e.g., be higher than the number of key holders), or be otherwise determined. The alpha shards of the plurality can overlap with each other (e.g., encompass overlapping portions of the encrypted cryptocurrency private key), be distinct from each other (e.g., encompass distinct portions of the encrypted cryptocurrency private key), or be otherwise related.

Generating beta shards by encrypting the alpha shards with the secondary encryption keys S400 function to add another layer of security to the cryptocurrency private key by encrypting the fragmented, encrypted information (e.g., cryptocurrency private key) a second time. S400 is preferably performed after completion of S300 and S620, but can alternatively be performed at any suitable time. S400 (and/or S300) can be performed once, or be serially repeated on each of the beta shards, such that the resultant stored shards are encrypted and/or sharded multiple times.

S400 is preferably performed by the key storage system, but can additionally or alternatively be performed by the secure computing system, by the key holder interface (e.g., wherein the alpha shards are transmitted to the key holder interface), by an external system (e.g., wherein the public secondary encryption keys and alpha shards are sent to the external system, and the beta shards returned), or by any suitable system.

S400 preferably encrypts each alpha shard of the plurality of alpha shards generated in S300, but can alternatively encrypt a subset of the plurality of alpha shards or any suitable set of alpha shards. The alpha shards of the plurality are preferably encrypted at substantially the same time, but can alternatively be encrypted serially or at any suitable time. The alpha shard is preferably discarded after beta shard generation (e.g., from the key storage system), but can be otherwise managed. The secondary encryption key used to encrypt an alpha shard is preferably that determined in S620, more preferably the public secondary encryption key from S620, but can alternatively be the private secondary encryption key, or be any other suitable encryption key.

S400 can optionally include: determining a set of secondary encryption keys to use for encryption S410; and encrypting the plurality of alpha shards using the set of determined secondary encryption keys.

Determining the specific secondary encryption keys functions to encrypt the alpha shard with a known secondary encryption key that is associated with a known key holder account that is authorized to collectively sign transactions from the cryptocurrency address. The specific secondary encryption keys to use for alpha shard encryption are preferably selected, but can be otherwise determined. The specific secondary encryption keys can be selected: randomly, by the management account, based on key holder attributes (e.g., social media connections, geographic location, number of cryptocurrency private keys encrypted with the respective secondary encryption key, etc.), based on selection of the key holder (e.g., wherein the key holder associated with the secondary encryption key is given authority to sign the transactions), or otherwise determined. When the key holder accounts are associated with multiple secondary encryption key(s), the specific secondary encryption key to be used in S400 can be: randomly selected, selected according to a set of rules (e.g., based on how many times the respective secondary encryption key has been used; based on how many cryptocurrency private keys the respective secondary encryption key has encrypted, etc.), or otherwise determined. A single secondary encryption key from each key holder account is preferably identified for use in S400, but multiple secondary encryption keys from a given user can alternatively be identified for use (e.g., when the number of required secondary encryption keys exceeds the number of specified users). However, the specific secondary encryption keys can be otherwise determined.

Determining the set of secondary encryption keys to use for encryption S410 can include determining (e.g., selecting): the number of secondary encryption keys and/or the specific secondary encryption keys to use in S420. The number of secondary encryption keys can be determined from: the number of alpha shards in the plurality (e.g., be equivalent to the number of alpha shards, be a multiple of the alpha shard number, etc.), the management account, the secure sharing technique, or otherwise determined. In one variation, the management account specifies the minimum number of secondary encryption keys or key holders required to sign a transaction or restore the cryptocurrency private key (M or k). In a second variation, the management account specifies the key holders (e.g., identifies the key holder accounts) that collectively have authority to sign the transaction, wherein the number of specified key holders is the number of secondary encryption keys. However, the number of secondary encryption keys can be otherwise determined.

Determining the secondary encryption key(s) can include: retrieving the secondary encryption key(s) (e.g., from the key holder, from storage, etc.); generating the secondary encryption key(s); or otherwise determining the secondary encryption key(s). In a first variation, retrieving the secondary encryption key(s) can include: requesting the secondary encryption key(s) from the key holder, wherein the key holder returns the secondary encryption key(s). In a second variation, retrieving the secondary encryption key(s) can include: retrieving the secondary encryption key(s) from the key holder interface (e.g., wherein the data to be encrypted or decrypted is transmitted to the key holder interface). In a third variation, retrieving the secondary encryption key(s) can include: retrieving the secondary encryption key (e.g., public secondary encryption key) from system storage (e.g., wherein the data to be encrypted or decrypted are retained within the system). However, the secondary encryption key(s) can be otherwise retrieved.

In a first variation, the management account specifies the key holder accounts that collectively have authority to sign the transaction, wherein a secondary encryption key associated with each specified key holder accounts is identified as a secondary encryption key to be used in S400. In a second variation, the key holders are selected based on the key holders' attributes, wherein the attributes of the set of selected key holders satisfy a rule. For example, the key holders can be selected based on their locations, wherein the key holders within the selected set are geographically distributed by a minimum distance. In another example, the key holders can be selected based on their respective corporate titles. However, the specific secondary encryption keys can be otherwise determined.

Encrypting the plurality of alpha shards with the set of secondary encryption keys functions to generate the beta shards using the secondary encryption keys determined in S410. Encrypting the plurality of alpha shards can include: receiving the secondary encryption key and encrypting the beta shard with the secondary encryption key.

The secondary encryption key is preferably pre-generated and retrieved (e.g., upon retrieval) from storage, but can additionally or alternatively be generated when the information is to be encrypted.

Each alpha shard is preferably encrypted once, with a single secondary encryption key, but can alternatively be encrypted multiple times, using multiple secondary encryption keys from the same or different key holder. A single alpha shard instance is preferably encrypted; alternatively, multiple instances of a given alpha shard can be encrypted, wherein each instance can be encrypted with a different secondary encryption key. A single secondary encryption key is preferably used to encrypt a single alpha shard of the plurality (example shown in FIG. 5), but can alternatively be used to encrypt multiple alpha shards of the plurality. In the latter instance, the number of alpha shards encrypted by the same secondary encryption key is preferably less than the minimum number of shards required to reconstruct the encrypted cryptocurrency private key (k), but can alternatively be any suitable number. Each alpha shard is preferably independently encrypted using the secondary encryption key, but the alpha shards from the same or different encrypted cryptocurrency private key can be encrypted as a batch.

Encrypting the plurality of alpha shards can optionally include assigning secondary encryption keys to alpha shards, wherein the assigned secondary encryption keys are used to encrypt the respective alpha shard. The assignment can be: random, determined by the management account, determined according to a set of rules, or otherwise determined. For example, the management account can specify the specific key-shard pair, specify the number of alpha shards to be controlled by a given key holder account (e.g., wherein the specific key-shard pairs can be automatically generated), specify the proportion of the alpha shard plurality to be controlled by a given key holder account (e.g., 5% by a first user, 10% by a second user), or otherwise assign the shards or set thereof to a key holder account. The secondary encryption key-to-shard assignment is preferably unrecorded, but can alternatively be stored (e.g., by the secure computing system, by a separate database, etc.) in association with the cryptocurrency private key identifier, the management account, or with any suitable information. In one variation, each key holder is assigned an alpha shard, wherein a secondary encryption key associated with the key holder is used to encrypt the alpha shard. When multiple alpha shards are assigned to a key holder, the same secondary encryption key can be used to encrypt all assigned alpha shards, or different secondary encryption keys can be used to encrypt different alpha shards. In a second variation, the secondary encryption keys from the specified key holder accounts are pooled, wherein the secondary encryption keys are assigned to the alpha shards from the pool. However, the secondary encryption keys can be otherwise assigned to or associated with the alpha shards.

Storing the beta shards in offline storage S500 functions add another layer of security by putting the fragmented, multiple-encrypted cryptocurrency private key in cold storage. S500 is preferably performed after S400, but can be performed at any suitable time. S500 is preferably performed by the key storage system, but can additionally or alternatively be performed by the secure computing system, a custodian (e.g., manually stored), or otherwise stored. The beta shards are preferably stored by the system, more preferably by the offline storage associated with the secure computing system, but can alternatively be stored by the key holders, the management entity, or by any other suitable system. The beta shards are preferably stored offline (e.g., in a system disconnected from a communications network such as the Internet), but can alternatively be stored online. The beta shards are preferably stored in a physical format (e.g., paper), but can alternatively be stored in a virtual format on a physically distinct storage system (e.g., the key holder interface, an HSM, etc.). The virtual copies of the beta shards are preferably discarded after S500 (e.g., from the secure computing system), but can be digitally stored offline or otherwise managed. The beta shards can each be assigned (and/or stored in association with) a unique identifier (e.g., unique within the set of beta shards associated with the same cryptocurrency private key; globally unique across all beta shards; etc.), be assigned the cryptocurrency private key identifier, be assigned with any other suitable identifier, or have no identifier.

S500 can include: generating offline beta shard representations S510, and physically storing the physical beta shard representations S520.

Generating physical beta shard representations S510 functions to store the beta shard in an offline storage format on a physical medium. This functions to air-gap the beta shard from the secure computing system during typical operation. Each physically separate and distinct piece of physical medium preferably stores the information for one beta shard, but can alternatively stores the information for multiple beta shards. In the latter instance, the beta shards can be from the same or different cryptocurrency private keys.

In a first variation, S510 can include generating a representation of the beta shards and storing the representation onto a physical medium. The representation preferably encodes the beta shard information, but can additionally or alternatively encode any other suitable information. The representation can include: alphanumeric representations of the beta shards, non-human-readable representations, machine-readable representations, visual representations, or any other suitable data representation. Examples of representations can include text strings, QR codes, bar codes, or any other suitable representation. Storing the representation can include: printing, etching (e.g., with acid, laser, etc.), machining, writing, or otherwise imprinting the representation onto the physical medium. The physical medium can include: paper, glass, wood, metal, ceramic, silicon, or any suitable medium.

In a second variation, S510 can include storing the beta shard (or derivative thereof, such as a hash) onto a physically distinct virtual storage system, such as an HSM or short-range wireless communication system (e.g., Bluetooth device). In this variation, the beta shard can be stored in a digital format, and can optionally be encrypted or otherwise processed prior to storage. However, S510 can be otherwise performed.

Physically storing the physical beta shard representations S520 functions to substantially permanently store the beta shards. The physical beta shard representations can be stored in association with (e.g., indexed according to): the cryptocurrency private key identifier, the respective beta shard identifier, the management account, the key holder account(s), the key holder, the primary encryption key, or with any other suitable information. The aforementioned information can also be stored in the physical beta shard representation, and/or the physical beta shard representation can be indexed according to the information. The physical beta shard representations can be randomly distributed within the offline storage; stored in an organized, indexed catalog; or otherwise stored. In one example, the physical beta shard representations for a cryptocurrency private key are stored in association with the cryptocurrency address (e.g., stored in a physical bundle or drawer labeled with the cryptocurrency address). However, the physical beta shard representations can be otherwise stored.

b. Primary and Secondary Encryption Key Generation.

The method can optionally include generating the primary encryption key S610. S610 is preferably performed by the secure computing system but can alternatively be performed by a user device or by any suitable computing system.

The primary encryption key is used to encrypt the cryptocurrency private key, and can optionally be used to decrypt the cryptocurrency private key. The primary encryption key is preferably a single key (e.g., a symmetric key), but can alternatively be the public key of an asymmetric key pair (e.g., wherein the private key is stored by the secure computing system for subsequent encrypted cryptocurrency private key decryption), or be any other suitable cryptographic key. The primary encryption key is preferably generated using a symmetric key algorithm (e.g., AES-128, AES-192, AES-256, other AES algorithms, Twofish, Serpent, Blowfish, CAST5, Kuznyechik, RC4, 3DES, Skipjack, IDEA, Beaufort cipher, Enigma machine, ROT13, XOR cipher, Vatsyayana cipher, etc.), but can alternatively be generated using an asymmetric key algorithm, be randomly generated, be generated from a user-provided seed (e.g., a user password), or be otherwise generated. The primary encryption key is preferably static, but can alternatively rotate (e.g., based on a timestamp, number of S700 iterations, number of S200 iterations for the cryptocurrency private key, number of encrypted private keys, etc.) or otherwise change.

The primary encryption key is preferably stored by the secure computing system, and is preferably not transmitted outside of the secure computing system. However, the primary encryption key can be held by the management entity (e.g., in an HSM) or otherwise managed. The primary encryption key can be encrypted prior to storage (e.g., using a secure computing system key), but can be otherwise secured or be unsecured. The primary encryption key can be stored in association with the management account, an identifier for the cryptocurrency private key (e.g., the corresponding cryptocurrency private key, the cryptocurrency address, etc.), or with any other suitable information. The primary encryption keys can be globally shared, specific to a management account, specific to a cryptocurrency private key, specific to a cryptocurrency address, specific to a set of addresses (e.g., specific to a key generation ceremony), specific to a user account, or otherwise shared.

Each management account can be associated with one or more primary encryption keys. In one variation, each management account is associated with a single primary encryption key that is used to encrypt all the cryptocurrency private keys associated with (e.g., owned by) the management account. In a second variation, different primary encryption keys are used to encrypt the cryptocurrency private keys.

Each cryptocurrency private key identifier can be associated with one or more primary encryption keys associated with the same or different management accounts. The associated primary encryption keys are preferably those used to encrypt the respective cryptocurrency private key, but can be otherwise associated with the cryptocurrency private key. The association between the cryptocurrency private key and the cryptocurrency private key can be stored with the cryptocurrency key pair-management account association, or be stored in a separate database.

S610 is preferably performed before S200, but can alternatively be performed during or after S200. An instance of S610 is preferably performed for each instance of S200 (e.g., a new primary encryption key is generated for each cryptocurrency private key encryption instance). Alternatively, S200 can share a primary encryption key with another S200 instance for the same or different cryptocurrency private keys, such that a single primary encryption key can be used across multiple encryption instances. In this variant, S610 can be performed upon: receipt of a key generation request from the management account or key holder account, management account creation, cryptocurrency information generation, or at any suitable time.

In one example, the same primary encryption key is used to encrypt or re-encrypt the cryptocurrency private key. In a second example, the same primary encryption key is used to encrypt the cryptocurrency private keys from two different cryptocurrency key pairs. In a third example, a new primary encryption key is generated and used each time the same cryptocurrency private key is encrypted (e.g., after cryptocurrency private key decryption and use). However, any suitable number of primary encryption keys can be used to encrypt any suitable set of cryptocurrency private keys.

The method can optionally include generating secondary encryption keys S620, which functions to generate the keys to be held by the multiple users (multiple key holders).

S620 is preferably performed asynchronously from S300 (e.g., before S300, before S200, etc.), but can alternatively be performed in parallel with S300 or performed after S300. S620 is preferably performed upon management account creation, but can alternatively or additionally be performed upon: key holder account creation, receipt of a secondary encryption key generation request, key holder account association with a cryptocurrency address, key holder account association with a wallet, cryptocurrency information generation, wallet generation, each S700 iteration, and/or at any suitable time.

S620 is preferably performed by the secure computing system, but can alternatively be performed by a user device or by any suitable computing system. When S620 is performed by the secure computing system, the secondary encryption key(s) or portions thereof can be sent to the key holder (e.g., using the key holder device or owner interface), example shown in FIG. 6. When S620 is performed by the key holder device, the secondary encryption key(s) or portions thereof can be sent to the system. For example, the key holder device can generate an asymmetric key pair including a private secondary encryption key and a public secondary encryption key, wherein the key holder device or key holder interface stores the private secondary encryption key and sends the public secondary encryption key to the system. However, the secondary encryption key can be otherwise shared with the system.

The secondary encryption keys (beta keys, beta encryption keys) can be used to encrypt the alpha shards to generate beta shards, to decrypt the beta shards, and/or otherwise used. The secondary encryption keys can be used to encrypt one or more alpha shards for one or more cryptocurrency private keys (from one or more cryptocurrency public-private key pairs).

Each secondary encryption key preferably includes a key pair (e.g., an asymmetric key pair including a private key and a public key), but can additionally or alternatively be the public key of the secondary encryption key pair, be the private key of the secondary encryption key pair, be a single key (e.g., a symmetric key), or be any other suitable cryptographic key.

In a first variation in which the secondary encryption keys include a single private key, the single private key is preferably retained by the key holder, wherein the key holder device associated with the key holder both generates and decrypts the beta shard (e.g., wherein the alpha shards are transmitted to the key holder for encryption and the beta shards are sent back to the system). However, any suitable secondary encryption key can be generated.

Figure 6:
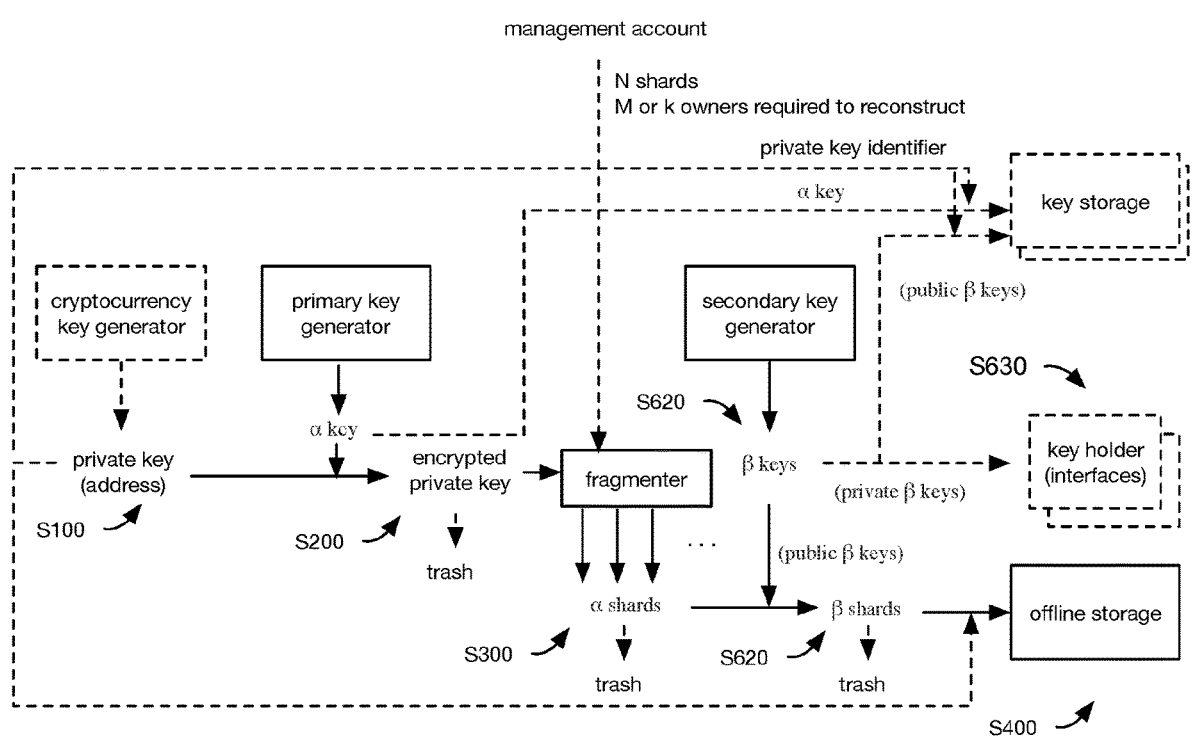
FIG. 6 is a schematic representation of an example of the method for storing the cryptocurrency private key.

In a second variation in which the secondary encryption keys include a key pair, the private secondary encryption key is preferably retained by the key holder (e.g., stored by the key holder interface), while the public secondary encryption key is preferably stored by the system (e.g., by the key storage system; the secure computing system; in association with the key holder account, etc.), example shown in FIG. 6. However, the secondary encryption keys can be otherwise stored. The private secondary encryption key is preferably used to decrypt beta shards, while the public secondary encryption key is used to generate the beta shards (e.g., used to encrypt the alpha shards). However, the public and private secondary encryption keys can be otherwise used.

Generating the secondary encryption key(s) preferably include generating the secondary encryption key(s) using a key generator, but can otherwise create the secondary encryption key(s). The secondary encryption key(s) are preferably generated using an asymmetric key algorithm (e.g., RSA algorithm, DSA, X25519 key exchange, elliptic curve cryptography, Diffie-Hellman key exchange, key serialization, asymmetric utilities, etc.), but can alternatively be generated using a symmetric key algorithm, be randomly generated, be generated from a user-provided seed (e.g., a user password), or be otherwise generated. The secondary encryption key is preferably static, but can alternatively rotate (e.g., based on a timestamp, number of S700 iterations, number of S200 iterations for the cryptocurrency private key, etc.) or otherwise change.

The secondary encryption key can be encrypted prior to storage (e.g., using a secure computing system key), but can be otherwise secured or be unsecured. The secondary encryption key can be stored in association with the wallet, the cryptocurrency address, a key holder account (e.g., the key holder account for which the secondary encryption key was generated), the management account, an identifier for the private key (e.g., the first private key for a given cryptocurrency address, second private key for the given cryptocurrency address, etc.), or with any other suitable information.

One or more secondary encryption keys can be determined for: a user or key holder account (key holder), a group of key holder accounts or users, a management account, a cryptocurrency address, a wallet, or any other suitable construct. In one variation, each key holder account is associated with a limited number of secondary encryption keys, wherein the same secondary encryption keys are used to encrypt any number of cryptocurrency private keys or derivative thereof (e.g., encrypted cryptocurrency private key fragments) associated with the key holder account. In this variation, the secondary encryption keys are preferably not regenerated for each method instance or S700 instance, but can be regenerated upon occurrence of a regeneration event, such as determination that the secondary encryption key has been compromised. In a second variation, different secondary encryption keys are determined for each cryptocurrency private key associated with the key holder account. However, any suitable number of secondary encryption keys can be determined for a given key holder account.

The number of secondary encryption keys can be predetermined, dynamically determined, or otherwise determined. For example, the number of secondary encryption keys can be specified by a management account, be based on the number of beta shards, be specified by the secret sharing technique, be based on the number of key holder accounts assigned as key holders for the cryptocurrency private key, be based on the number of key holder accounts within the system, or be otherwise determined.

The method can optionally include distributing the secondary encryption key(s) to the key holder S630. The distributed keys can include: the single private key, the private key of the asymmetric key pair, or any other suitable key. The keys are preferably physically distributed, but can alternatively be virtually distributed. Physical distribution can include: storing the secondary encryption key(s) (e.g., the private key) on a physical device (e.g., HSM, NFC device, Bluetooth device, etc.), discarding the system copy of the distributed secondary encryption key, and sending the physical device to the key holder; converting the secondary encryption key(s) into a physical representation (e.g., QR code) and sending the physical representation to the key holder; or otherwise physically distributing the secondary encryption key(s). Virtual distribution can include using a key exchange technique or any other suitable key distribution method. However, the secondary encryption key(s) can be otherwise distributed.

The key holders preferably satisfy a set of secondary key distribution rules, but can be randomly selected or be any suitable set of key holders. Examples of key distribution rules include: geographic distributed (e.g., the key holders are physically separated by more than a minimum geographical distance, such as 100 mi, etc.), association with a predetermined set of corporate titles, presence on a whitelist, exclusion from a blacklist, AML/KYC verification, and/or any other suitable set of rules. However, the key holders can be otherwise selected.

c. Restoring Information from Offline Storage.

Figure 7:
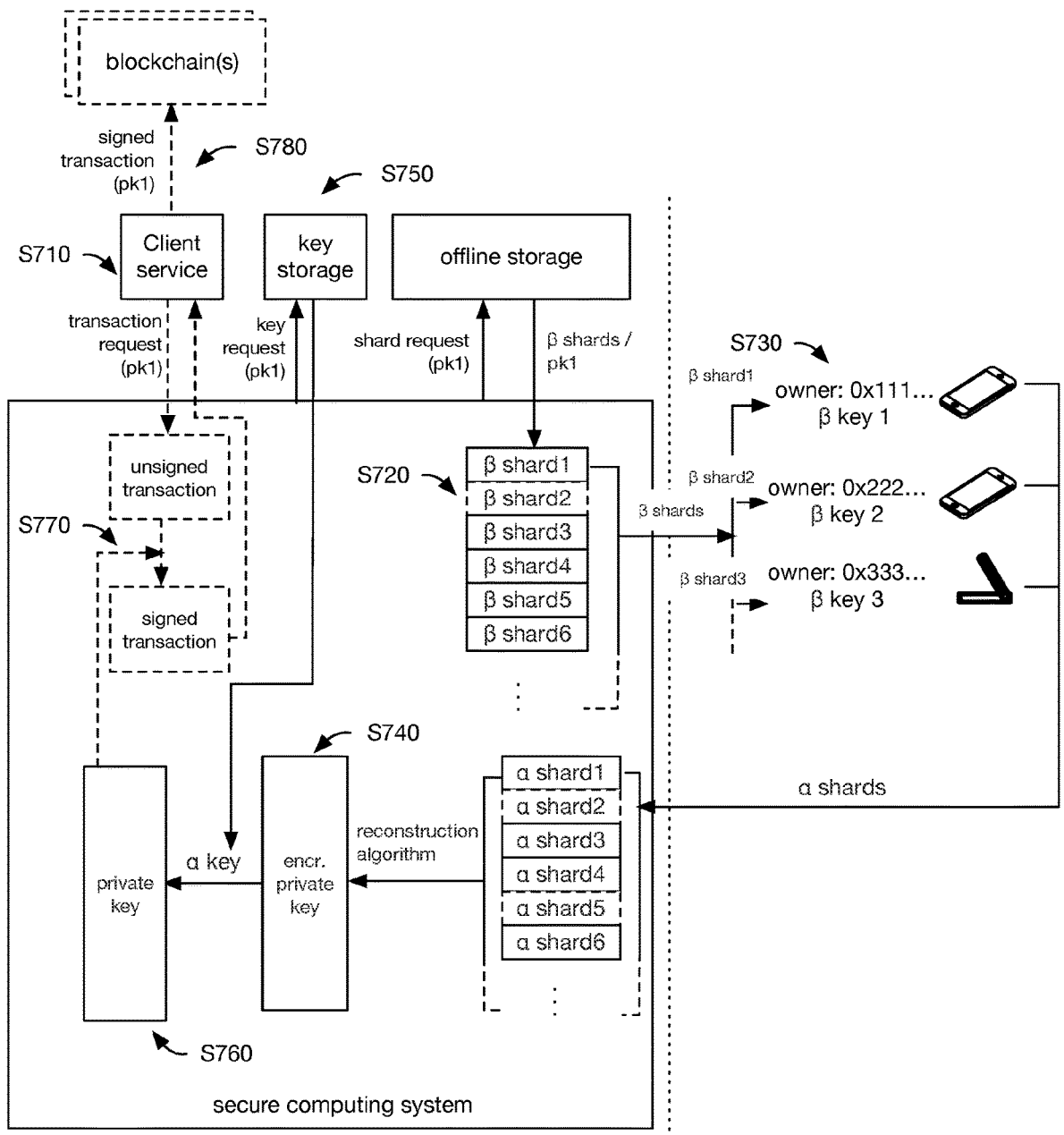
FIG. 7 is a schematic representation of an example of the method for signing a transaction using the stored cryptocurrency private key.

As shown in FIG. 2, restoring the stored information S700 functions to reconstruct the fragmented, multiple-encrypted information for use, example shown in FIG. 7. For example, when the stored information is the cryptocurrency private key, S700 includes restoring the cryptocurrency private key, functions to reconstruct the fragmented, multiple-encrypted cryptocurrency private key for use (e.g., to sign a transaction). S700 is preferably performed and/or coordinated by the secure computing system, but can alternatively be performed or coordinated by any suitable system. S700 can be performed in response to: receipt of a transaction request S710; receipt of a retrieval request (e.g., wherein the retrieval request identifies the cryptocurrency private key); at a predetermined frequency; receipt of a restoration request from an associated account (e.g., management or key holder account); or upon occurrence of any suitable event. The transaction request preferably includes an unsigned transaction, but can be any other suitable request. The transaction request can include: the cryptocurrency address, an endpoint cryptocurrency address, transaction information (e.g., asset quantity to be transferred, asset type, etc.), or any other suitable information.

S700 can include: retrieving the beta shards from storage S720; determining alpha shards using the secondary encryption keys 730; reconstructing the encrypted cryptocurrency private key by recombining the regenerated alpha shards S740; and decrypting the encrypted cryptocurrency private key with the primary encryption key S760. The method can optionally include: receiving a transaction request from client service S710; retrieving the primary encryption key S750; signing the transaction with the cryptocurrency private key S770; and transmitting the signed transaction to the blockchain S780.

Retrieving the beta shards from storage S720 functions to temporarily bring the beta shards online (e.g., temporarily convert the beta shards into a virtual format). S720 is preferably performed in response to receipt of the transaction request S710, but can additionally or alternatively be performed after retrieval confirmation receipt from the management account or a key holder account (e.g., wherein a retrieval confirmation query or multi-factor authentication request can be sent to the management account or a key holder account associated with the cryptocurrency address), in response to receipt of a beta shard retrieval request (including the beta shard identifier, private key identifier, secondary encryption key identifier, key holder identifier, etc.) from a key holder (e.g., via the key holder interface), or performed at any suitable time. S720 is preferably performed based on the cryptocurrency private key identifier (e.g., cryptocurrency address) identified within the transaction request, but can alternatively or additionally be performed based on the management account (e.g., a management entity identifier), or be performed based on any other suitable information. S720 preferably retrieves all beta shards associated with the cryptocurrency address, but can alternatively retrieve a portion of the beta shards. S720 can be performed manually, automatically or otherwise performed. In one example, the method includes: receiving a transaction request, including a cryptocurrency address, from a client service at the secure computing system S710, and transmitting the cryptocurrency address to a custodian (human or robotic), wherein the custodian identifies and retrieves the physical beta shard representations associated with the cryptocurrency address and virtualizes the beta shards (e.g., by scanning the physical representation, reading the beta shard values off the physical storage device, etc.). However, S720 can be otherwise performed. The method can optionally include discarding or destroying the physical beta shard representations after beta key restoration (e.g., by shredding, burning, erasing, etc.); putting the physical beta shard representations back into storage; or otherwise managing the physical beta shard representations.

In variants, the method can include receiving a transaction request S710. The transaction request is preferably received at the secure computing system from one or more of the client services, but can alternatively or additionally be received from a user account or from any suitable source. The transaction request can include: a cryptocurrency private key identifier, a transaction amount, a destination address, a set of inputs (e.g., associated with the cryptocurrency private key identifier), a change address (e.g., associated with a pre-generated cryptocurrency key pair that was pre-stored using S100-S500 and is unassigned to another user account; a new cryptocurrency key pair, etc.), and/or any other suitable transaction information. The transaction request is preferably generated by the requesting client service, but can be otherwise generated.

Determining the alpha shards using the secondary encryption keys S730 functions to decrypt the beta shards into alpha shards.

S730 is preferably performed after S720, but can be performed at any suitable time. S730 is preferably performed after the key holder is verified, but can alternatively be performed after receipt of a transaction request, or be performed at any suitable time. S730 is preferably performed for at least the minimum number of beta shards required for encrypted cryptocurrency private key reconstruction (k), but can alternatively be performed for any suitable number of beta shards. Multiple instances of S730 (e.g., for each beta shard) can be performed concurrently, serially, based on key holder interface availability, or otherwise performed.

Determining the alpha shards can include: decrypting the alpha shards using the secondary encryption keys, calculating the alpha shards from the beta shards, or otherwise determination the alpha shards. The secondary encryption key is preferably the private secondary encryption key corresponding to the public secondary encryption key used to encrypt the respective alpha shard resulting in the beta shard, but can alternatively or additionally be a secondary symmetric encryption key (e.g. wherein the beta shard is encrypted using the secondary symmetric encryption key), or be any suitable set of encryption keys.

S730 is preferably performed by the key holder interfaces (or user devices), but can alternatively be performed by the secure computing system or by any suitable system. The beta shard is preferably transmitted to the key holder, wherein the alpha shards are determined by the key holder (e.g., by the key holder device, by the key holder interface, etc.), but the secondary encryption key can additionally or alternatively be transmitted to the secure computing system or otherwise accessed.

The resultant alpha shards are preferably subsequently sent to the secure computing system, but can alternatively be sent to any other suitable endpoint. The method can optionally include discarding the virtual beta shards and/or alpha shards from the key holder interface and/or secure computing system after alpha shards generation.

Figure 4:
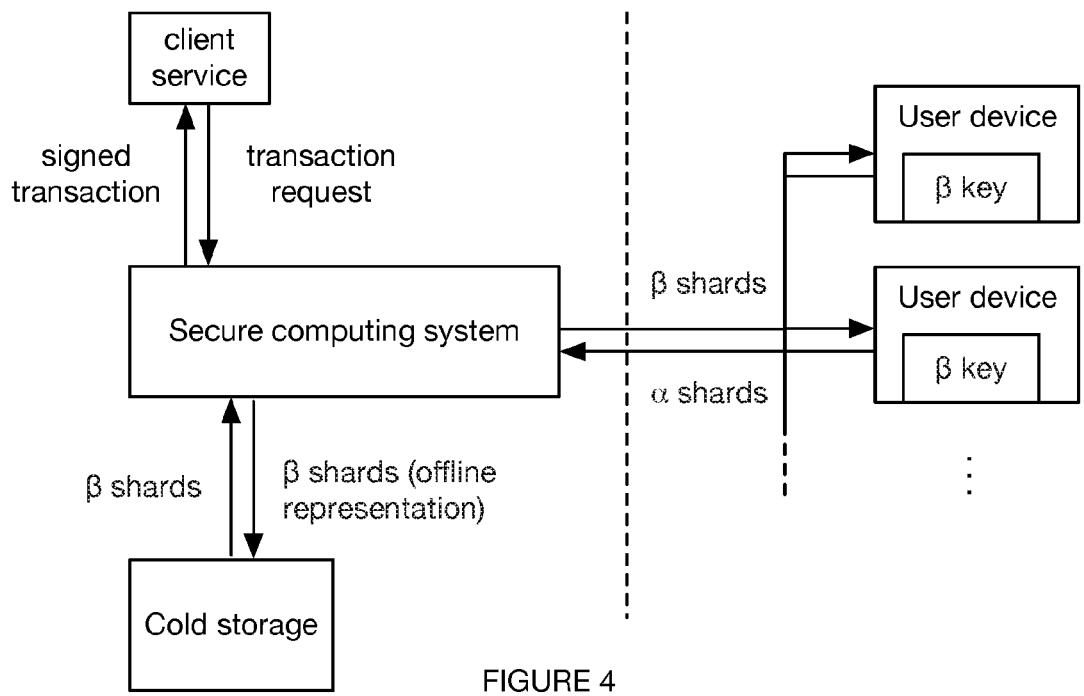
FIG. 4 is an example of data flow through an example system.

In a first variation, S730 includes: identifying key holder accounts associated with the cryptocurrency address and/or each retrieved beta shard, and transmitting the beta shards (retrieved in S720) to key holder interfaces (or user device) associated with the identified key holders (key holder accounts), wherein the key holder interface receives the beta shards (e.g., from the secure computing system), decrypts the beta shards into alpha shards using the respective secondary encryption key (e.g., the private secondary encryption key, the symmetric secondary encryption key, etc.), and sends the alpha shards back to the secure computing system (examples shown in FIG. 4 and FIG. 7).

The transmission to the key holder interface can optionally include transaction information, such as the cryptocurrency address or transaction amount. The transmission can be verified by the key holder interface and/or secure computing system prior to process execution (e.g., bets shard decryption using the secondary encryption keys).

All or a portion of the key holder accounts associated with the cryptocurrency private key can be identified. Alternatively, the key holder accounts can be those currently online (e.g., logged in accounts) or be any suitable key holder account. All or a portion of the beta shards can be transmitted to each identified key holder account. In one example, all beta shards can be transmitted to each key holder account, wherein the respective key holder interface can attempt to decrypt each beta shard, and can send back all attempts or the successful attempts. In a second example, a key holder account (or set thereof) can be identified for each beta shard, wherein the beta shard can only be sent to the identified key holder account(s). The identified key holder account is preferably for the key holder holding the private secondary encryption key paired with the public secondary encryption key that was used to encrypt the respective beta shard, but can be any suitable key holder account.

All or a subset of the secondary encryption keys stored by each key holder interface can be used (or attempted to be used) in decrypting the beta shards. For example, the key holder interface can attempt to decrypt a beta shard using all, a subset, or a single secondary encryption key stored by the key holder interface.

In a second variation, S730 includes determining the secondary encryption key at the secure computing system (e.g., retrieving the key from storage; generating the key from a seed, such as a secondary encryption key password or biometric entry; requesting the secondary encryption key from the key holder; etc.) and decrypting the beta shards using the secondary encryption key at the secure computing system. In this variation, S730 can request the cryptographic seed or authorization to retrieve the secondary encryption key from the key holder account or the management account. However, S730 can be otherwise performed or controlled.

Some variants of the method can require key holder verification before performance of one or more processes. This functions to ensure that the secondary encryption keys have not been stolen or compromised. For example, each transmission and/or key holder interface access can require key holder verification before proceeding. The key holders can be verified: in response to S710, after S720, before S730, or at any other suitable time. The key holders can be verified using single-factor authentication, multi-factor authentication, API tokens, biometric information, receipt of information that only the key holder would know (e.g., receipt of a beta shard request that identifies the correct beta shard information from the correct key holder within a predetermined timeframe that the beta shard is online), or otherwise verified.

Reconstructing the encrypted information (e.g., encrypted cryptocurrency private key) by recombining the regenerated alpha shards S740 functions to piece together the information (e.g., encrypted cryptocurrency private key) from all or a subset (N or more) of the alpha shards. S740 can be performed: when a threshold number of alpha shards (associated with the cryptocurrency private key, cryptocurrency private key identifier, etc.) are received from the key holder interfaces; when a reconstruction verification is received from the management account (or from a key holder account associated with the cryptocurrency private key); and/or at any suitable time. S740 is preferably performed by the secure computing system, but can alternatively be performed in a remote system (e.g., at an aggregation user device). S740 is preferably performed using the reconstruction method associated with the division method (e.g., the secret sharing algorithm), but can be otherwise performed. For example, S740 can include solving for the secret using the received alpha shards (e.g., using the combination method of the sharing scheme used to shard the cryptocurrency private key, such as sss-combine), concatenating the alpha shards together, applying a fair secret reconstruction algorithm to the received alpha shards, or otherwise determining the encrypted cryptocurrency private key.

Determining the primary encryption key S750 functions to determine the key that can decrypt the encrypted cryptocurrency private key. S750 can be performed upon occurrence of S710, S720, S730, or at any suitable time. The retrieved primary encryption key is preferably the single private key (e.g., generated using a symmetric key algorithm and used to encrypt the cryptocurrency private key prior to sharding), but can alternatively be the private key half of an asymmetric key pair (e.g., wherein the public key was used to encrypt the cryptocurrency private key), or be any suitable key. S750 is preferably performed by the secure computing system but can be performed by any suitable system. S750 can include: retrieving the primary encryption key based on the cryptocurrency private key identifier (e.g., cryptocurrency address); regenerating the primary encryption key from a cryptographic seed, wherein the cryptographic seed can be provided by a key holder account or management account; or otherwise determining the primary encryption key S750. However, S750 can be otherwise performed. The method can optionally include discarding the retrieved primary encryption key after use; restoring the primary encryption key to storage; or otherwise managing the primary encryption key.

Decrypting the encrypted information (e.g., encrypted cryptocurrency private key) with the primary encryption key S760 functions to regenerate the cryptocurrency private key associated with the cryptocurrency address identified in the transaction request. S760 is preferably performed after S740 and S750, but can be performed at any suitable time. S760 is preferably performed by the secure computing system, but can alternatively be performed by any suitable system. The method can optionally include discarding the encrypted cryptocurrency private key after decryption (e.g., from the secure computing system), but the encrypted cryptocurrency private key can be otherwise managed.

Signing the transaction with the cryptocurrency private key S770 functions to authorize asset removal from the identified cryptocurrency address. S770 is preferably performed after S760, but can be performed at any suitable time. S770 is preferably performed by the secure computing system, but can alternatively be performed by any suitable system. S770 is preferably performed according to the transaction signing method for the given cryptographic currency (cryptocurrency protocol), but can be otherwise performed. The method can optionally include: discarding the cryptocurrency private key after signing (e.g., from the secure computing system); initiating a new instance of S200-S400 for the decrypted cryptocurrency private key; initiating a new instance of the method, starting from S100, and transferring the assets to the new wallet; assigning a new cryptocurrency key pair to the user account associated with the decrypted cryptocurrency private key (wherein the new key pair can be pre-generated and have a private key pre-stored using S100-S500, or be newly generated and have the private key stored using S100-S500, etc.); disassociating the cryptocurrency private key (identifier) from the user account, or otherwise managing the cryptocurrency private key.

Transmitting the signed transaction to the blockchain S780 functions to broadcast the signed transaction to the other blockchain nodes, such that the signed transaction can be recorded in the ledger and to transfer the identified assets to the identified endpoint. The signed transaction is preferably sent through the client services (e.g., the client service originating the transaction request, a second client service) to the blockchains, but can be otherwise sent.

An alternative embodiment preferably implements the above methods in a computer-readable medium storing computer-readable instructions. The instructions are preferably executed by computer-executable components preferably integrated with a system. The system can include a cryptocurrency information generator, a primary key generator and storage system, a secondary key generator, multiple physically distinct secondary key storage mechanisms, and a physical offline storage system that stores encrypted, multiple-encrypted cryptocurrency private keys for a given cryptocurrency address. The system can interface with client services and key holder interfaces (e.g., user devices). The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for facilitating offline storage of a cryptocurrency key, the system comprising:
    one or more processors programmed with instructions that, when executed by the one or more processors, cause operations comprising:
        generating a symmetric-encryption ciphertext from a cryptocurrency private key by encrypting the cryptocurrency private key with a symmetric encryption key;
    performing sharding of the symmetric-encryption ciphertext into key shards such that only a threshold number of the key shards is required for reconstructing the symmetric-encryption ciphertext, the threshold number being less than an overall number of the key shards derived from the sharding;
    generating asymmetric-encryption shard ciphertexts from the key shards by encrypting the key shards with asymmetric encryption keys associated with the key shards, wherein generating the asymmetric-encryption shard ciphertexts from the key shards comprises:
        determining, based on geographic locations associated with respective entities, a subset of entities of an entity set to respectively control regeneration of the key shards from the asymmetric-encryption shard ciphertexts such that the geographic locations are separated from one another by a threshold distance; and
        using, based on the determination of the subset of entities, a first public key associated with a first entity of the subset of entities as one of the asymmetric encryption keys to encrypt at least one key shard of the key shards; and
    causing storage of representations of the asymmetric-encryption shard ciphertexts in an offline computer storage system.

2. The system of claim 1, wherein each key shard of the key shards is encrypted using a different asymmetric encryption key to generate a corresponding shard ciphertext.

3. The system of claim 1, wherein generating the asymmetric-encryption shard ciphertexts from the key shards comprises:
    randomly associating a first asymmetric encryption key with a first key shard of the key shards as an encryption key to be used for generating a first asymmetric-encryption shard ciphertext from the first key shard; and
    generating, based on the random association, the first asymmetric-encryption shard ciphertext from the first key shard by encrypting the first key shard using the first asymmetric encryption key.

4. The system of claim 1, the operations further comprising:
    in response to a request to sign a transaction that includes a cryptocurrency address associated with the cryptocurrency private key, retrieving the asymmetric-encryption shard ciphertexts from the offline computer storage system and transmitting the asymmetric-encryption shard ciphertexts to a plurality of entities via a network;
    in response to transmitting the asymmetric-encryption shard ciphertexts, obtaining a first key shard corresponding to a first shard ciphertext from a first entity and a second key shard corresponding to a second shard ciphertext from a second entity different from the first entity, the first key shard being generated by the first entity decrypting the first shard ciphertext, the second key shard being generated by the second entity decrypting the second shard ciphertext; and
    in response to determining that the threshold number of the key shards has been obtained from the threshold number of the plurality of entities, regenerating the cryptocurrency private key from the key shards and signing the transaction with the cryptocurrency private key.

5. A method comprising:
    generating a ciphertext from a cryptocurrency private key by encrypting the cryptocurrency private key with a primary encryption key;
    performing sharding of the ciphertext into key shards such that only a threshold number of the key shards is required for reconstructing the ciphertext, the threshold number being less than an overall number of the key shards derived from the sharding;
    generating shard ciphertexts from the key shards by encrypting the key shards with secondary encryption keys associated with the key shards;
    storing representations of the shard ciphertexts in an offline storage system;
    in response to a request to sign a transaction that includes a cryptocurrency address associated with the cryptocurrency private key, retrieving the shard ciphertexts from the offline storage system and transmitting the shard ciphertexts to a plurality of entities via a network;
    in response to transmitting the shard ciphertexts, obtaining a first key shard corresponding to a first shard ciphertext from a first entity and a second key shard corresponding to a second shard ciphertext from a second entity different from the first entity, the first key shard being generated by the first entity decrypting the first shard ciphertext, the second key shard being generated by the second entity decrypting the second shard ciphertext; and in response to determining that the threshold number of the key shards has been obtained from the threshold number of the plurality of entities, regenerating the cryptocurrency private key from the key shards and signing the transaction with the cryptocurrency private key.

6. The method of claim 5, wherein each key shard of the key shards is encrypted using a different secondary encryption key to generate a corresponding shard ciphertext.

7. The method of claim 5, wherein generating the shard ciphertexts from the key shards comprises:

randomly associating a first secondary encryption key with a first key shard of the key shards as an encryption key to be used for generating a first shard ciphertext from the first key shard; and generating, based on the random association, the first shard ciphertext from the first key shard by encrypting the first key shard using the first secondary encryption key.

8. The method of claim 5, wherein generating the shard ciphertexts from the key shards comprises:

determining a subset of entities of an entity set to respectively control regeneration of the key shards from the shard ciphertexts; and using, based on the determination of the subset of entities, a first public key associated with a first entity of the subset of entities as one of the secondary encryption keys to encrypt at least one key shard of the key shards.

9. The method of claim 8, wherein determining the subset of entities comprises determining, based on geographic locations associated with respective entities, the subset of entities to respectively control regeneration of the key shards from the shard ciphertexts such that the geographic locations are geographically dispersed.

10. The method of claim 5, wherein the representations of the shard ciphertexts comprises QR code representations corresponding to the shard ciphertexts.

11. The method of claim 5, wherein the offline storage system is an air-gapped computer system.

12. The method of claim 5, wherein:

generating the ciphertext from the cryptocurrency private key comprises generating a symmetric-encryption ciphertext from the cryptocurrency private key by encrypting the cryptocurrency private key with a symmetric encryption key;

generating the shard ciphertexts from the key shards comprises generating asymmetric-encryption shard ciphertexts from the key shards by encrypting the key shards with asymmetric encryption keys associated with the key shards; and storing the representations of the shard ciphertexts comprises storing representations of the asymmetric-encryption shard ciphertexts in the offline storage system.

13. One or more non-transitory computer-readable media storing instructions that, when executed by one or more processors, cause operations comprising:

generating a ciphertext from a cryptocurrency private key by encrypting the cryptocurrency private key with a primary encryption key;

performing sharding of the ciphertext into key shards such that only a threshold number of the key shards is required for reconstructing the ciphertext, the threshold number being less than an overall number of the key shards derived from the sharding;

generating shard ciphertexts from the key shards by encrypting the key shards with secondary encryption keys associated with the key shards, wherein representations of the shard ciphertexts are stored in an offline storage system;

in response to a request to sign a transaction that includes a cryptocurrency address associated with the cryptocurrency private key, retrieving the shard ciphertexts from the offline storage system and transmitting the shard ciphertexts to a plurality of entities via a network;

in response to transmitting the shard ciphertexts, obtaining a first key shard corresponding to a first shard ciphertext from a first entity and a second key shard corresponding to a second shard ciphertext from a second entity different from the first entity, the first key shard being generated by the first entity decrypting the first shard ciphertext, the second key shard being generated by the second entity decrypting the second shard ciphertext; and in response to determining that the threshold number of the key shards has been obtained from the threshold number of the plurality of entities, regenerating the cryptocurrency private key from the key shards and signing the transaction with the cryptocurrency private key.

14. The non-transitory computer-readable media of claim 13, wherein each key shard of the key shards is encrypted using a different secondary encryption key to generate a corresponding shard ciphertext.

15. The non-transitory computer-readable media of claim 13, wherein generating the shard ciphertexts from the key shards comprises:

randomly associating a first secondary encryption key with a first key shard of the key shards as an encryption key to be used for generating a first shard ciphertext from the first key shard; and generating, based on the random association, the first shard ciphertext from the first key shard by encrypting the first key shard using the first secondary encryption key.

16. The non-transitory computer-readable media of claim 13, wherein generating the shard ciphertexts from the key shards comprises:

determining, based on geographic locations associated with respective entities, a subset of entities of an entity set to respectively control regeneration of the key shards from the shard ciphertexts; and using, based on the determination of the subset of entities, a first public key associated with a first entity of the subset of entities as one of the secondary encryption keys to encrypt at least one key shard of the key shards.

17. The non-transitory computer-readable media of claim 13, wherein the representations of the shard ciphertexts comprises QR code representations corresponding to the shard ciphertexts.

18. The non-transitory computer-readable media of claim 13, wherein the offline storage system is an air-gapped computer system.

19. The non-transitory computer-readable media of claim 13, wherein:

generating the ciphertext from the cryptocurrency private key comprises generating a symmetric-encryption ciphertext from the cryptocurrency private key by encrypting the cryptocurrency private key with a symmetric encryption key;

generating the shard ciphertexts from the key shards comprises generating asymmetric-encryption shard ciphertexts from the key shards by encrypting the key shards with asymmetric encryption keys associated with the key shards; and storing the representations of the shard ciphertexts comprises storing representations of the asymmetric-encryption shard ciphertexts in the offline storage system.

\* \* \* \* \*